Dec. 1, 1964   J. J. O'MALLEY ETAL   3,159,052
TRANSMISSION
Filed Feb. 26, 1959   4 Sheets-Sheet 4
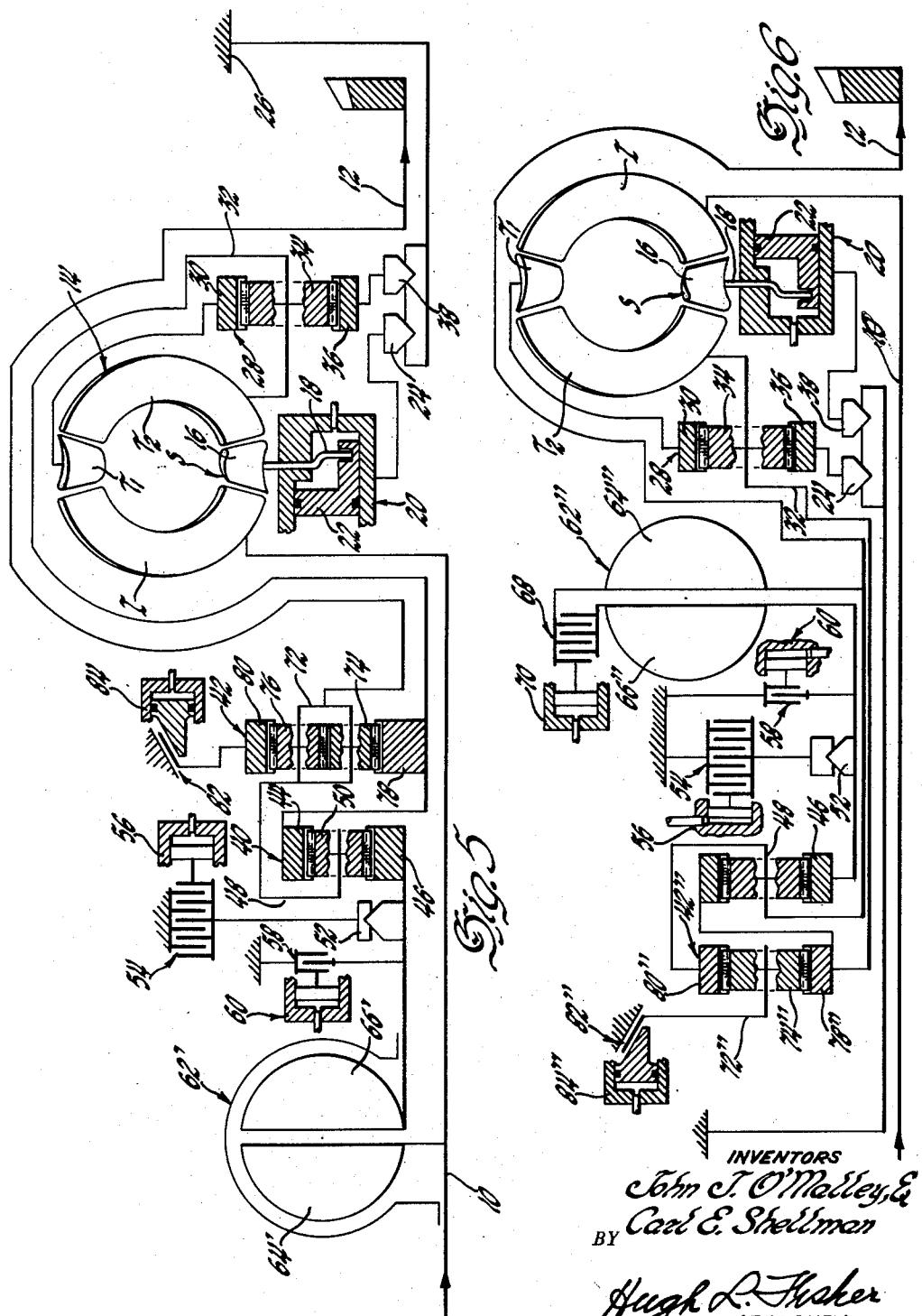
INVENTORS
John J. O'Malley, &
BY Carl E. Shellman
Hugh L. Fisher
ATTORNEY.

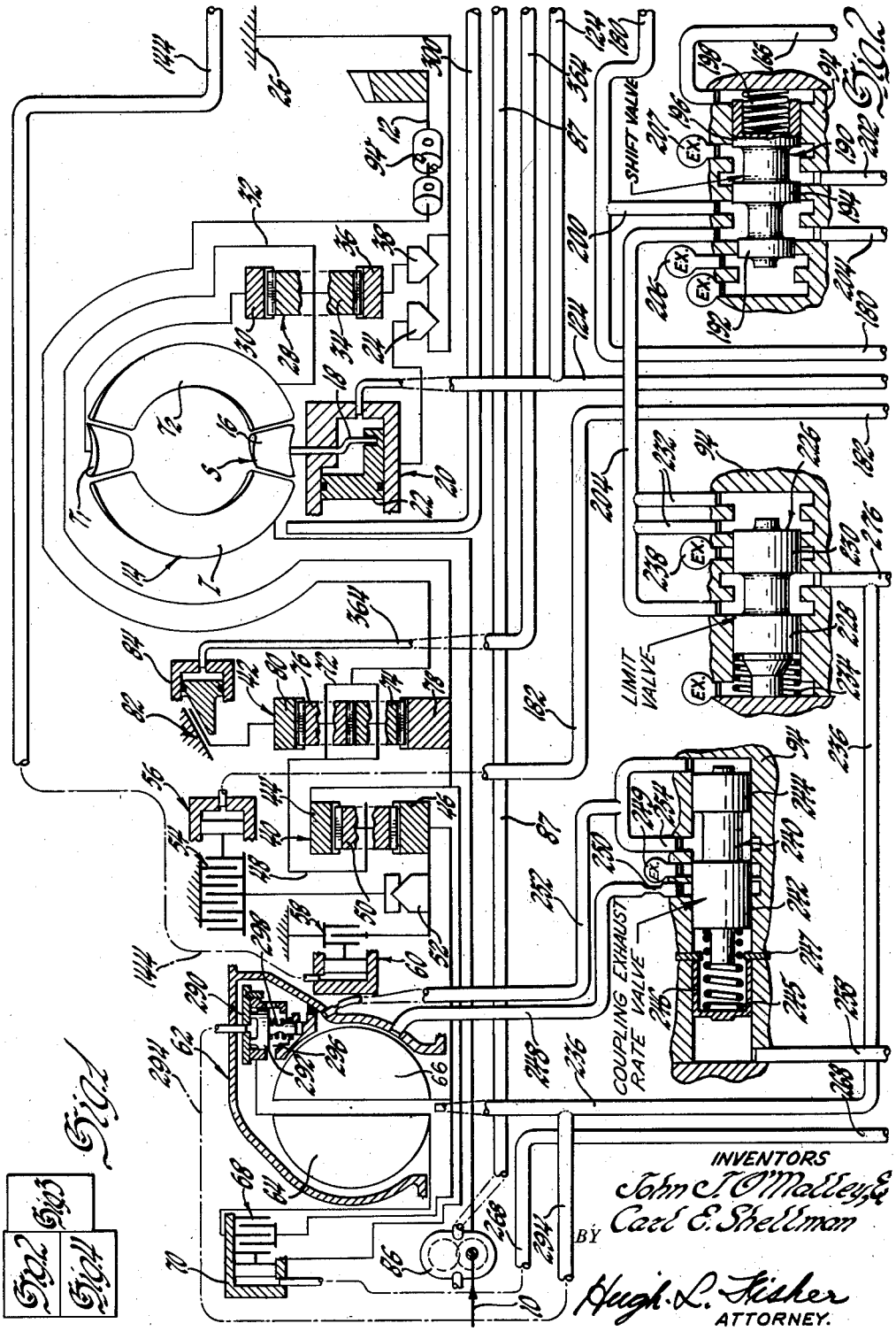

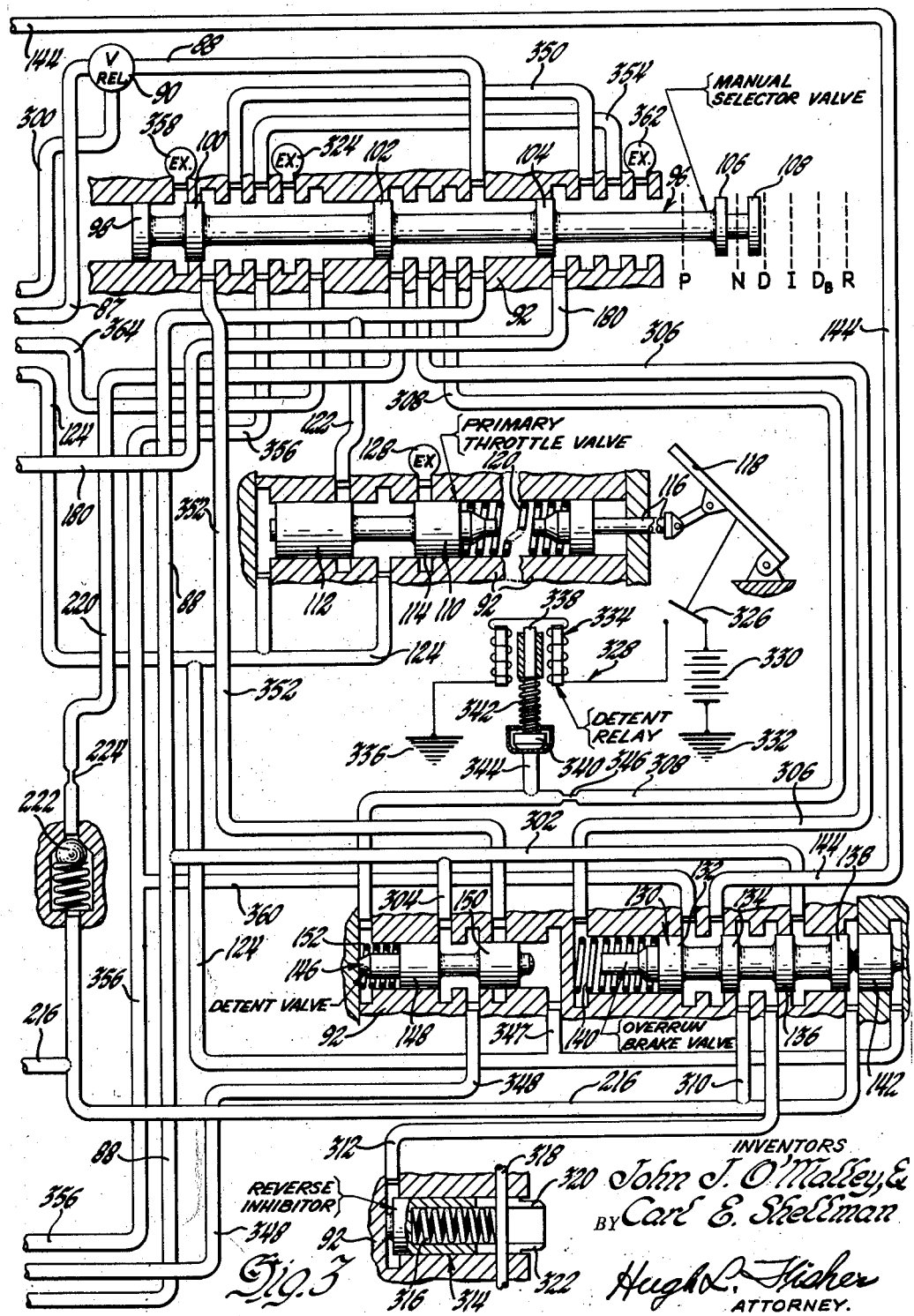

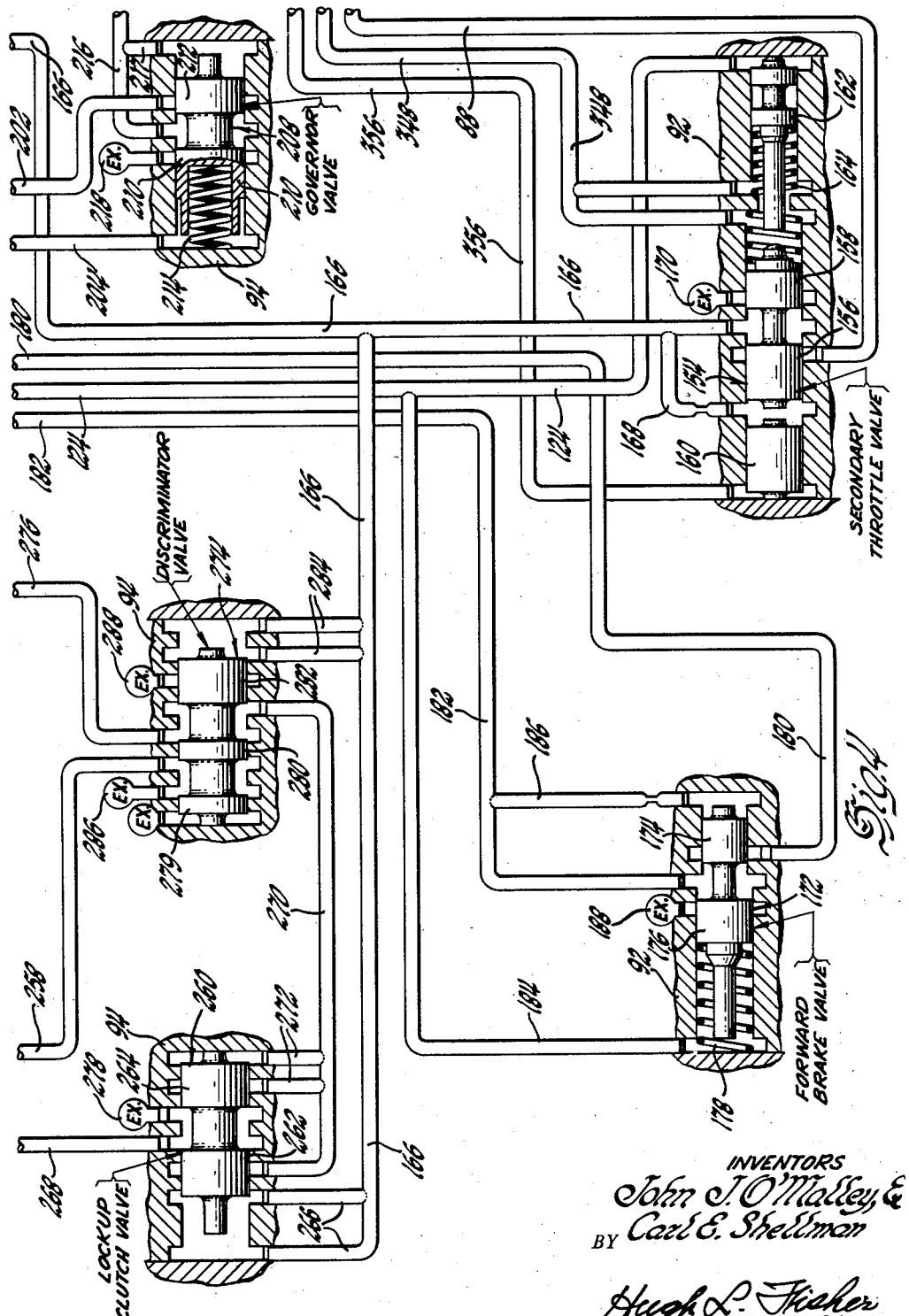

United States Patent Office 3,159,052
Patented Dec. 1, 1964

3,159,052
TRANSMISSION
John J. O'Malley and Carl E. Shellman, Detroit, Mich., assignors to General Motors Corporation, Detroit, Mich., a corporation of Delaware
Filed Feb. 26, 1959, Ser. No. 795,774
59 Claims. (Cl. 74—645)

This invention relates to transmissions in general and particularly to improvements in automatic transmissions of the type adapted, although not exclusively, for use with motor vehicles.

It is fundamental that automatic transmissions should change ratios smoothly and efficiently. Therefore, common practice is to incorporate in the drive train one or more hydrodynamic torque transmitting devices, such as fluid couplings and torque converters. Both the fluid coupling and the torque converter permit a so-called "fluid start" since they can be designed so as to be incapable of transferring enough torque at engine idle speeds to move the vehicle. Also, the fluid medium absorbs shocks in the drive line thereby affording the desired smooth operation. Smooth operation is a particular advantage of the torque converter, since an infinite number of ratios within predetermined limits are provided with no perceptible sensation of a ratio change to the operator as in a step-ratio transmission. Also, by dumping and filling a fluid coupling a very smooth engaging and disengaging clutch action is obtained.

Disadvantages common to both couplings and converters are that the inherent fluid slippage reduces the operating efficiency and that both are commonly designed for efficient forward drive operation; however, during coast drive or overrun operation they are relatively ineffective. As a result, the available engine braking is of little assistance in slowing down the vehicle. This means that the wheel brakes must assume the extra burden.

Another basic requirement of an automatic transmission is that there should be as few elements as possible, particularly friction elements, but they still should be easily assembled and not produce a complex operation. This premise also extends to the transmission control system.

With the foregoing in mind the invention broadly contemplates the provision of an automatic transmission incorporating hydrodynamic devices and gearing novelly arranged so as to operate efficiently in both forward and coast drive. Also, by the invention the hydrodynamic devices are so related to the drive train that fluid losses are minimized, especially in those operating ranges where the losses tend to be great; the hydrodynamic devices are advantageously utilized to multiply torque, produce ratio changes through the gearing, and afford overrun braking with all ratio changes and torque multiplication taking place smoothly and relatively imperceptibly; a minimum number of planetary gear units are utilized to supplement the torque multiplication and provide drive in both forward and reverse directions; and torque dividing and lock-up features are incorporated in the transmission so as to increase the operating efficiency thereof.

In accordance with the preceding objectives, the invention additionally seeks to provide a transmission in which a single device serves plural functions. Specifically, the invention contemplates utilizing a dual rotor hydrodynamic device that may operate as a fluid clutch in forward drive and as a fluid brake in coast drive. When functioning as a fluid clutch, the two rotors perform as driving and driven clutch members, and when functioning as a fluid brake, one of the rotors is held by a brake so that rotation of the other is resisted by the resultant churning effect on the fluid. Moreover, when functioning as a fluid clutch, the invention provides a lock-up clutch for the hydrodynamic device so as to eliminate fluid slippage between the rotors in an operating range where efficiency is particularly desirable.

For controlling the aforedescribed transmission, the invention proposes a unique uncomplicated control system employing a minimum number of components utilized in a new and unusual way. According to the invention, part of the system is made up of revolvable valving and the remainder of stationary valving, with intercommunication being made so as to notify each valving system of the others status. Somewhat more specifically stated, the invention provides the foregoing system with revolvable valving that, due to the rotation of the valve elements, is speed responsive; that is supplied both operating pressure, as determined by the needs of the selected operating range, and torque demand pressure by the stationary valving; and that supplies the stationary valving with a speed responsive pressure.

To operate the aforementioned plural function hydrodynamic device, the invention seeks to provide a control system wherein the supply and the exhaust of the hydrodynamic device are effectively controlled whether performing as a clutch or a brake. In the proposed system and according to the invention, a lock-up clutch valve becomes effective to control the engagement of the hydrodynamic device lock-up clutch after the device is filled whereupon both the lock-up clutch valve and the exhaust of the hydrodynamic device are, in turn, placed under the control of a relay valve that operates according to whether the hydrodynamic device is performing as a clutch or a brake.

Other significant objects of the invention include the provision of a new and different governor with an auxiliary feed, and torque valving for producing a torque demand pressure that is modified according to a different scheme determined by the transmission operating range.

In furnishing overrun braking for a transmission it is desirable to have different ranges of braking so as to cover most of the possible operating conditions. This is preferable to the usual practice of attempting to provide a single braking range that represents a compromise and resutls in too much braking at certain times while at other times there is inadequate braking. Also, provision should be made in one braking range for intermittent coast drive and forward drive operation, i.e., the engine should be permitted to take over drive from the wheels in accordance with the driver's desires and without interference from the overrun brake. If the driver releases the accelerator pedal and the vehicle starts to coast, the overrun brake should become again immediately effective.

Therefore, the invention proposes an arrangement whereby two ranges of overrun or coast drive braking are available, one offering substantial braking resistances and the other moderate braking resistances. The invention provides in the moderate braking range braking resistances that decrease as the speed decreases and are effective only during overun operation, whereas in the substantial braking range the braking is available only when a certain torque speed relationship exists provided the torque load is below a predetermined maximum.

The foreging and other objects and advantages will be apparent from the following description and from the accompanying drawings in which:

FIGURE 1 demonstrates how FIGURES 2, 3, and 4, depicting schematically parts of the control system, are to be aligned so as to show the entire system; and FIGURES 5 and 6 illustrate modified forms of the transmission shown schematically in FIGURE 2.

GENERAL DIAGRAMMATIC ARRANGEMENT

Referring first to FIGURE 2 and to the transmission depicted therein schematically, the numerals 10 and 12 designate, respectively, the power and load shafts for the transmission. The power shaft 10 may be drive connected to the vehicle engine and the load shaft 12 to the vehicle wheels in any suitable manner.

Drive from the engine is transferred by the power shaft 10 to a hydrodynamic torque transmitting device, such as the dual turbine torque converter designated generally at 14. The torque converter 14 has an impeller I drive connected to the power shaft, a first turbine $T_1$, and a second turbine $T_2$, and variable position stator S, each being provided with appropriate vane structure. The stator S has movable vanes represented diagrammatically as a single vane 16 arranged to be attached to the upper end of a crank 18. For actuating the crank 18 so as to revolve the stator vane 16 to different positions, there is provided a stator control motor 20 in which is slidably housed a piston 22. Fluid pressure moves the piston 22 and this movement, in turn, is translated into rotary movement of the crank 18 due to the connection with the lower end thereof.

Any tendency for the stator S to revolve backwards is resisted by a one-way device 24 grounded at 26.

The elements of the torque converter 14 all combine in a well known manner to define a fluid working circuit in which fluid being pumped outwardly by the impeller I proceeds successively to the first turbine $T_1$, the second turbine $T_2$, and the stator S in a clockwise direction. When functioning as a converter, the position of the stator vane relative to the working circuit will, as is well known, determine the extent of torque multiplication. In this embodiment the multiplication can be varied as the vane 16 moves between so-called low and high angle positions in accordance with the relationship between throttle pressure, derived as will be explained, and supplied to the stator control motor 20, and charging pressure within the converter 14 acting on the external exposed face of the stator control motor piston 22. With the converter 14 operating in the torque multiplying range and the throttle pressure zero, the charging pressure within the converter 14 will move the stator control piston 22 so as to place the stator vane 16 in the low angle position for a normal crusing operation, but with throttle pressure maximum as with full throttle operation the piston 22 will be moved by this maximum throttle pressure so as to position the vane 16 in the high angle high performance position. This latter high angle position affords improved acceleration inasmuch as the torque converter 14 is conditioned to generate maximum torque, and is also a helpful feature for overcoming extreme road loads. Depending upon the relationship between converter charging pressure and throttle pressure, the stator vane 16 can assume an infinite number of positions between these high and low angle positions.

Planetary gearing further enhances the torque multiplication derived from the torque converter 14, particularly the turbine gear unit, denoted generally at 28. This gear unit 28 is so arranged as to have a ring gear 30 and an output planet carrier 32 therefor drive connected, respectively, to the first turbine $T_1$ and the second turbine $T_2$. A series of planet pinions 34 are journaled on the carrier 32 and intermesh with the ring gear 30 and a reaction sun gear 36. Reverse rotation of this reaction sun gear 36 is prevented by a one-way device 38 similar in construction to one-way device 24 and also grounded at 26.

As can be now seen, when the torque converter 14 commences operation the first turbine $T_1$ will be effective to deliver torque to the ring gear 30. Since the reaction sun gear 36 cannot revolve backwards, the output carrier 32 will be revolved forwardly at a reduced speed thereby multiplying the torque delivered by first turbine $T_1$ by a value that is determined by the ratio of this gear unit 28. For example, if the converter 14 and the gear unit 28 both have torque ratios of 2 to 1 at stall, i.e., with the output carrier 32 held, the overall ratio will be 4 to 1 or one increment of input torque will be increased to four output increments. As the speed of the impeller I increases that of the first turbine $T_1$ will likewise increase until the second turbine $T_2$ becomes operative to deliver torque to the carrier 32. Thereafter, the differential in speeds between the first turbine $T_1$ and the second turbine $T_2$ will determine the reaction torque to which the reaction sun gear 36 is subjected and accordingly the torque ratio of the gear unit 28. Ultimately, as impeller speed increases, the speed of the second turbine $T_2$ will increase until it assumes all of the drive and the first turbine $T_1$ becomes ineffective. This is referred to as the coupling point for the converter 14 and at this time the stator S will start to freewheel, i.e., revolve forwardly. Then, the converter 14 will function as a fluid coupling with drive being transferred therethrough in a substantially unitary or direct drive ratio except for the inherent fluid slippage. Also, the turbine gear unit 28 will be relatively ineffective since an approximate lock-up condition will occur when the first turbine $T_1$ and the second turbine $T_2$ revolve at substantially the same speed.

The planetary gearing, in addition to the turbine gear unit 28, includes a forward drive gear unit 40 and a reverse drive gear unit 42, both positioned in the drive train between the turbine gear unit 28 and the load shaft 12. The forward unit 40 comprises an input ring gear 44 drive connected to the turbine unit output carrier 32, a reaction sun gear 46, and an output planet carrier 48 drive connected to the load shaft 12. A series of planet pinions 50 are revolvably supported on the carrier 48 and intermesh with the ring and sun gears 44 and 46.

Provision is made for two different drive ratios through this forward unit 40; one, a reduced speed drive is obtained when the sun gear 46 is prevented from revolving backwards while the input ring gear 44 is driven forwards. As a result, the output carrier 48 will be revolved at a reduced speed. To prevent reverse rotation of the reaction sun gear 46, a one-way device 52, similar to devices 24 and 38, is combined with a forward drive brake 54. The forward drive brake 54 is operated by a forward drive brake servo motor 56 that is of the piston type and is fluid pressure actuated, as will be explained. The forward drive brake 54 and one-way device 52 combine to prevent reverse rotation of the reaction sun gear 46 but permit free forward rotation thereof. Hence, when the drive direction is reversed as during overrun or coast drive and the output carrier 48 assumes the drive, the reaction sun gear 46 may revolve forwardly unrestricted. When this is not desired and overrun braking resistance from the vehicle engine is wanted, an overrun or coast drive brake 58 is employed. Overrun brake 58 is engaged by a fluid actuated overrun brake servo 60 and will prevent rotation of the reaction sun gear 46 in either direction. Then, when the output carrier 48 is driving the input ring gear 44 will be overdriven, desirable for engine braking, as will become apparent.

For direct drive another hydrodynamic device such as the fluid coupling, shown generally at 62, is utilized. The fluid coupling 62 has dual rotors with one designated as a driving rotor or pump 64 drive connected to the forward input ring gear 44 and the other a driven rotor or turbine 66 joined to the forward unit reaction sun gear 46. This coupling 62 can be dumped and filled, in a way to be described, and when filled, will cause the forward unit sun and ring gears 46 and 44 to be revolved at substantially the same speed and thereby lock up the forward unit 40 for the other drive ratio, almost a direct drive, except for the mentioned fluid slippage.

If the overrun brake 58 is engaged, the turbine 66 will be grounded along with reaction sun gear 46, and then the fluid coupling 62 will no longer function as a clutch but as a brake. This aspect of the operation, which will become more apparent, offers additional coast or overrun braking since when the input ring gear 44 is being overdriven, as just explained, it will also drive the pump 64 at substantially the same speed. However, with the turbine 66 stationary, the fluid will be churned and this churn effect will offer a braking resistance that impedes rotation of the ring gear 44 and accordingly load shaft 12.

To eliminate fluid slippage when the coupling 62 is performing as a clutch for the forward drive gear unit 40, a lock-up clutch 68 is installed between the pump 64 and turbine 66 and is engaged by a fluid actuated lock-up clutch servo motor 70. When this lock-up clutch 68 is engaged, the forward unit ring and sun gears 44 and 46 must revolve at the same speed, and hence, a true direct drive is afforded through this gear unit 40. Fluid slippage through the coupling 62 is no longer a factor, and therefore, the operating efficiency of the transmission is increased.

The reverse gear unit 42 has the output planet carrier 72 therefor interposed between the forward unit output carrier 48 and the load shaft 12. Revolvably mounted on the carrier 72 are first and second sets of pinions 74 and 76. These sets of pinions 74 and 76 both intermesh with each other and respectively engage an input sun gear 78 and a reaction ring gear 80. A reverse drive brake 82 is incorporated in the transmission and is arranged to be engaged by a fluid actuated reverse drive brake servo motor shown at 84 so as to prevent rotation of the reaction ring gear 80. Because of the double sets of pinions 74 and 76, when the reverse drive brake 82 is engaged to hold the reaction ring gear 80 stationary, the carrier 72 will be forced to revolve backwards at a reduced speed determined by the ratio of the gear unit 42.

In the FIGURE 2 embodiment the various brakes referred to, such as the reverse drive brake 82, the forward drive brake 54, and the overrun brake 58, may be of any appropriate type, e.g., band, disk, or cone brakes may be employed. Also, the one-way devices 24, 38, and 52, may be of known construction utilizing rollers, sprags, or the like, to prevent relative rotation between the races in one direction only.

The units of the FIGURE 2 transmission combine, as will now be explained, to provide, in addition to a Neutral, several operating ranges that will be designated as Drive, Intermediate, Drive Brake, and Reverse Ranges.

In Neutral all of the clutches and brakes are disengaged and the coupling 62 is empty. The torque converter 14 is effective, but because all of the clutches and brakes are disengaged, no drive can be transferred by either the forward or the reverse drive gear units 40 and 42 to the load shaft 12.

When the status of the transmission is changed for operation in the Drive Range, the forward drive brake 54 is engaged, thus affording reaction for the forward drive gear unit 40. Drive then will be transferred by the power shaft 10 through the torque converter 14 and by the turbine gear unit 28 to the forward drive gear unit 40. Now, as expalined before, the drive will be delivered by the forward gear unit carrier 48 to the load shaft 12 at a reduced speed with respect to the speed of the input ring gear 44. The overall low speed ratio will be determined by the torque multiplication afforded by the converter 14 and the ratios of both the turbine gear unit 28 and the forward drive gear unit 40. Of course, multiplication from the converter 14 and the turbine gear unit 28 will decrease as engine speed increases with normal road loads until the low speed ratio is determined almost entirely by the forward unit 40.

At some selected speed the fluid coupling 62 will be filled whereupon the forward drive gear unit 40 will change to the substantially direct drive or high speed ratio and the transmission will be conditioned for high speed drive operation. Sometime after the establishment of this high speed ratio, the lock-up clutch 68 is engaged, in a way to be mentioned, and the actual direct drive relationship will be effective with the carrier 48 for the forward unit 40 being revolved at the same speed as the output carrier 32 for the turbine gear unit 28. The only fluid losses, then, in the high speed ratio with the coupling 62 locked up, will be those through the torque converter 14. Also, whether the forward drive gear unit 40 is set for an underdrive in the low speed ratio or for a direct drive in the high speed ratio, the operator may still alter the position of the stator vane 16 to increase the torque multiplication of the torque converter 14 and achieve improved acceleration.

In the Intermednate Range the transmission status is the same as when conditioned for the low speed ratio in the Drive Range except that the overrun brake 58 is engaged. Hence, during overrun, for instance, when the vehicle is coasting down a hill, the overspeeding of the forward unit ring gear 44, the output carrier 48 being now driven and the reaction sun gear 46 being prevented from revolving forwardly by the overrun brake 58, will be transferred to the turbine unit carrier 32 and the second turbine $T_2$. Therefore, the torque converter 14 will also attempt to overdrive the engine, which the engine will resist. The resultant retarding effect on the converter impeller I will slow the second turbine $T_2$ due to the churning effect from the fluid. This resistance will be transferred by the drive train back to the vehicle wheels and in this manner moderate engine braking is obtained. When the engine commences to drive again the low first speed ratio becomes effective, as described.

If more overrun braking is needed, e.g. when descending a steep hill, there is available the Drive Brake Range in which all of the units will be conditioned, as in the Intermediate Range, except that the fluid coupling 62 will be filled with fluid. This means that the fluid coupling 62 will function as a brake since the overrun brake 56 will hold both the coupling turbine 62 and the forward unit reaction sun gear stationary. As a consequence, the overspeeding of the forward unit output ring gear 44 by the load shaft 12 will be resisted by the churning effect from the coupling 62 and also by the engine braking made available, as explained with respect to the Intermediate Range. Hence, the total braking effect is this range will be the sum of that from the coupling 62 operating somewhat as a slipping ground brake and that from the engine.

In Reverse only the reverse drive brake 82 is engaged, and this is by fluid actuation of the reverse drive brake servo motor 84. The drive train extends through the power shaft 10, the torque converter 14, the turbine gear unit 28, and to the reverse gear unit 42. The reverse unit 42 will reverse the direction of rotation so as to cause the load shaft 12 to revolve backwards, the reverse rotation resulting from the use of two sets of pinions 74 and 76, as has been mentioned.

CONTROL SYSTEM

The various units of the FIGURE 2 transmission are controlled by the system's valving shown in the FIGURES 2, 3 and 4. Fluid pressure for the system and these units is provided by fluid pressure supply pump 86 preferably driven at the speed of the power shaft 10 as viewed. The pump 86 is of the positive displacement type so that as soon as the engine is started fluid pressure is delivered to the discharge line 87 and then to a main supply line 88 for the system. In between the discharge line 87 and the main supply line 88 a suitable pressure regulator valve 90 is positioned so as to regulate and maintain the pressure of the fluid in the main supply line 88 at some chosen level, e.g., 100 p.s.i.

The control system depicted is divided so as to have one part of the valving slidably housed within bores in a stationary body 92 and the other part of the valving movably disposed within bores in a rotatable body 94. The stationary body 92 may be affixed to some part of the transmission whereas the rotatable body 94 is drive connected to the load shaft 12 so as to be revolvable therewith. The rotatable valve body valves are so situated as to be influenced by centrifugal force as will become apparent.

The valves housed within the two valve bodies 92 and 94 will first be described individually under the following designated headings. Then, the relationship of each to the system will be explained in the operational summary.

*Manual Selector Valve*

The main supply line 88 extends through a bore in the stationary valve body 92 shown in which bore is slidably housed a manual selector valve denoted by the numeral 96 at the upper part of FIGURE 3. The manual selector valve 96 has formed thereon a series of spaced lands 98, 100, 102 and 104 arranged when the valve 96 is moved so as to align the various ports opening into the bore with main supply line 88 thereby distributing fluid pressure in accordance with the setting of the valve 96. Movement of the valve 96 is through the agency of a fork, or equivalent, received between end flanges 106 and 108 on the valve 96. Movement, then, of a lever (not shown) positioned within the proximity of the vehicle steering wheel will move the selector valve 96 to any of the settings designated by the legends P, N, D, I, $D_B$ and R corresponding, respectively, to Park, Neutral, Drive Range, Intermediate Range, Drive Brake Range and Reverse, previously mentioned in the explanation of the operation of the transmission proper. The sytsem's operation in each range will be discussed in detail during the operational summary.

*Primary Throttle Valve*

In FIGURE 3 just below the selector valve 96 is a primary throttle valve viewed generally at 110. The primary throttle valve 110 is slidable in another bore in the stationary body 92 and has spaced lands 112 and 114. In the same bore and to the right of the primary throttle valve 110, an accelerator pedal actuated member 116 is shown arranged to be moved by an accelerator pedal 118. Movement of the accelerator pedal 118 is transferred by the accelerator pedal actuated member 116 to the primary throttle valve 110 through a spring 120.

When the accelerator pedal 118 is depressed, the primary throttle valve land 112 will open the port connected to a branch 122 of the main supply line 88, and pressure fluid, then will be supplied to the primary throttle pressure supply line 124. A branch of this primary throttle pressure supply line 124 communicates with the end area of the primary valve 110 determined by land 112 and when sufficient to overcome the opposing force will move the primary throttle valve 110 to the right until the land 114 opens an exhaust port 128, while land 112 closes the port to the main supply line branch 122. The pressure in the throttle pressure supply line 124 will be reduced until the primary throttle valve 110 again is shifted back and land 112 re-opens the port to the main supply line branch 122. This well known regulating action will continue with the pressure developed thereby being determined by accelerator position. Consequently, as the accelerator pedal 118 is depressed, the throttle pressure developed in the primary throttle pressure supply line 124 will likewise increase so as to be throttle position responsive and accordingly representative of the torque demand imposed upon the transmission. By the arrangement, with the accelerator pedal 118 fully depressed and the throttle wide open, primary throttle pressure will become equivalent to maintain line pressure or 100 p.s.i.

The torque facet of the primary throttle pressure can probably be best explained by using an example in which it is desired to maintain the vehicle speed constant by manipulating the accelerator pedal 118. Then, as can be seen, when the road load increases the accelerator pedal 118 would have to be depressed to overcome the increased load and maintain the vehicle speed constant. This, in turn, increases throttle pressure. Similarly, if the road load decreases, the accelerator pedal 118 would have to be released slightly and the throttle pressure will accordingly decrease.

An accelerator pedal actuated throttle valve has been shown; however, the valve 110 could be operated by vacuum pressure derived, e.g., from the intake manifold as shown in the application S.N. 674,655 to Howard E. Olsen, filed July 29, 1957 and entitled "Transmission," now Patent No. 3,077,122 issued February 12, 1963.

*Overrun Brake Valve*

Also displayed in FIGURE 3 at the lower part thereof is an overrun brake valve 130. The overrun brake valve 130 is slidably housed within a stationary valve body bore and is provided with spaced lands 132, 134, 136, and 138. A spring 140 biases the valve 130 to the right and into engagement with a plug valve 142. The overrun brake valve 130 functions to supply fluid pressure to an overrun brake supply line 144 in communication with the overrun brake servo motor 60. Therefore, when this servo motor 60 is so energized with fluid pressure, the overrun brake 58 will be engaged.

*Detent Valve*

A detent valve 146 is situated in the stationary valve body 92 opposite the overrun brake valve 130 and is of the spool type with spaced lands 148 and 150. A spring 152 biases the detent valve 146 to the inoperative position. The purpose of this valve 146 is to afford a detent or forced downshift, as will become apparent.

*Secondary Throttle Valve*

In the lower right part of FIGURE 4 is a secondary throttle valve, designated generally at 154, arranged for slidable movement within another bore in the stationary body 92. The secondary throttle valve 154 is formed with lands 156 and 158 and has in the same bore on the side adjacent land 156 a single land plug valve 160 and on the opposite side adjacent land 158 a stem valve 162. Interposed between stem valve 162 and the secondary throttle valve 154 is a spring 164.

The secondary throttle valve 154 is a regulating valve and operates to modulate pressure in accordance with variations in primary throttle pressure within predetermined limits, e.g., between a minimum of 35 p.s.i. and a maximum of 100 p.s.i. The minimum pressure is produced in the absence of primary throttle pressure since the spring 164 will force the secondary throttle valve 154 to the left until land 156 cracks the port connected to the main supply line 88. Fluid pressure, then, will be delivered to the secondary throttle pressure supply line 166 and, in turn, by a restricted passage 168 to the end area adjacent land 156. The pressure acting on the end area of land 156 when adequate will cause land 156 to close the port connected to the main supply line 88 and cause land 158 to open an exhaust port 170. Therefore, in this manner and similar to the action of the primary throttle valve 110, the minimum 35 p.s.i. pressure will be developed determined entirely by the weight of the spring 164. When the primary throttle valve 110 commences to generate primary throttle pressure to the line 124, this pressure will be delivered to the end area of the stem valve 162 and will increase the leftward bias on the secondary throttle valve 154. As a result the secondary throttle pressure is increased in proportion to primary throttle pressure until secondary throttle pressure attains the 100 p.s.i. maximum or is equivalent to main line pressure.

*Forward Brake Valve*

To the left of the secondary throttle valve 154 in FIGURE 4, a forward brake valve, denoted generally at 172, is formed with a small diameter land 174 and a large diameter land 176. The valve 172 is urged to the open position by a spring 178. This valve 172 also operates as a regulating valve and controls the pressure supplied by a Drive Range supply line 180 to a forward brake supply line 182 in accordance with the torque demand imposed upon the transmission. Primary throttle pressure delivered to the spring end of the forward brake valve 172 by a branch 184 of the primary throttle pressure supply line 124 renders this valve 172 torque conscious.

In operation, with the forward brake valve 172 biased to the open position, fluid pressure in the Drive Range supply line 180 will be transferred between the lands 174 and 176 to the forward brake supply line 182. A restricted branch communicates with the forward brake valve end area defined by the small diameter land 174. Hence, the pressure delivered by the restricted branch 186, when of a predetermined value, will be enough to overcome the force from the spring 178 and force the valve 172 to the left whereupon land 174 will close the port connected to the Drive Range supply line 180 and the land 176 will crack an exhaust port 188. The pressure in the forward brake supply line 182 will be relieved until the spring 178 is again able to return the forward brake valve 172 to the position in which land 174 re-opens the port connected to the Drive Range supply line 180.

In the absence of throttle pressure the forward brake valve 172 will regulate at some minimum pressure, e.g., 20 p.s.i. As soon as primary throttle pressure is available, the regulated pressure will increase until equivalent to main line pressure and maximum primary throttle pressure or 100 p.s.i.

As can be now seen, the pressure in the forward brake supply line 182 and supplied to the forward brake servo motor 56 for engaging the forward brake 54 will vary with primary throttle pressure so that at light throttle openings the forward brake 54 is engaged by a relatively low pressure and with a full throttle opening is engaged with maximum pressure. This insures a gradual and consequently a smooth engagement at light throttle openings and a quick engagement at increased throttle openings.

Shift Valve

Denoted generally in the bottom right section of FIGURE 2 by the numeral 190 is a shift valve. The shift valve 190 is provided with three spaced lands 192, 194 and 196 and is slidable in the rotatable valve body 94. The arrangement of the shift valve 190 in the rotatable valve body 94 is such that centrifugal force will urge the shift valve 190 to the right and to the depicted position against the opposing bias from a spring 198. When the shift valve 190 is in the leftmost or downshift position, the ports connected to a branch 200 of the Drive Range supply line 180 and a governor supply line 202 are aligned by the shift valve lands 194 and 196 while the lands 192 and 194 establish communication between the port to a coupling supply line 204 and an exhaust port 206. When the shift valve 190 is in the demonstrated upshift position the governor feed line 202 is drained to an exhaust port 206 between lands 194 and 196 and the branch 200 is placed in communication with the coupling supply line 204 by lands 192 and 194. Also, secondary throttle pressure when present in the supply line 166 opposes upshift movement of the shift valve 190, and therefore, the upshift point for the shift valve 190 will be varied with throttle position. Suitable limits for upshift movements of the shift valve 190 may be established, and for exemplary purposes these may be set at 18 m.p.h. with zero throttle opening and at 71 m.p.h. with full throttle opening.

Governor Valve

In FIGURE 4, positioned just above the secondary throttle valve 154, is a governor valve designated generally at 208. The governor valve 208 is mounted within another of the bores in the rotatable valve body 94, has spaced lands 210 and 212, and is biased to the right both by a spring 214 and centrifugal force when the rotatable valve body is revolving. The governor valve 208 functions somewhat like a regulator valve to control the governor pressure delivered to the governor pressure supply line 216 with the governor pressure developed increasing as the speed of rotation of the rotatable body increases.

In operation, when pressure fluid is delivered to the governor valve 208 by the governor feed line 202, the pressure fluid will proceed between the lands 210 and 212 and to the governor pressure supply line 216. A branch 217 of the supply line 216 communicates with the governor valve end area established by the diameter of land 212 so that when the pressure in the branch 217 builds up to some predetermined value the governor valve 208 will be moved to the left until land 212 closes the port connected to the governor feed line 202 and the land 210 opens and exhaust port 218 in the bore of the governor valve 208. The pressure in line 216 will be reduced until the governor valve 208 again opens the port connected to the governor feed line 202. This previously described regulation action continues as long as the shift valve 190 maintains communication between the branch 200 of the Drive Range supply line 200 and the governor feed line 202.

When the transmission is conditioned for Neutral and the Drive Range supply line 180 is no longer supplied fluid pressure, as will be explained more in detail, a secondary provision is made for supplying fluid pressure to the governor valve 208. This is accomplished with the manual selector valve 96 in the Neutral and Reverse settings so that governor auxiliary feed line 220 is supplied fluid pressure by the main supply line 88. Transfer of fluid pressure from the governor auxiliary feed line 220 to the governor supply line 216 is controlled by a ball check valve 222. Check valve 222 is arranged to open when the governor pressure in governor supply line 216 falls below a predetermined minimum and insures that pressure fluid is supplied to the line 216 for reasons to be mentioned. A restriction 224 upstream of the ball check valve 222 insures that the main system is not affected by any reduction in pressure that could result from the action of the governor valve 208 relieving pressure via exhaust port 218.

The governor valve 208 will function somewhat as a relief valve to control the pressure in line 216 and maintain it at some minimum predetermined level. This pressure level will increase if the vehicle is rolling in Neutral because centrifugal force urging the governor valve 208 to the right will require that a greater pressure exist in line 216 before exhaust port 218 is opened. But, in the absence of centrifugal force, the governor valve 208 will establish a pressure in the line 216 that is determined by the spring 214, a pressure less than main line pressure. The ball check valve 222 will open and close often enough to aid the governor valve 208 to maintain this pressure.

Limit Valve

The coupling supply line 204 extends to a port in a rotatable valve body bore in which is slidably mounted a limit valve, assigned the numeral 226 and provided with spaced equal diameter lands 228 and 230. Branches 232 of the coupling supply line 204 extend to the frontal area defined by the limit valve land 230 and the pressure so transferred will urge the limit valve 226 to the left, as will centrifugal force due to the arrangement of the limit valve 226 in the rotatable valve body bore, against the opposing bias from a spring 234. When the combination of centrifugal force and the pressure acting on the end of land 230 is sufficient, the limit valve 226 will be moved to the illustrated position in which lands 228 and 230 align the ports connected to the coupling supply line 204 and a coupling feed line 236 thereby commencing the filling of the fluid coupling 62 with pressure fluid.

The limit valve 226 protects the control system downstream therefrom against excessive pressure drops that tend to result when the fluid coupling 62 is being filled. As soon as the pressure in the coupling supply line 204 commences to drop below some selected value, the limit valve 226 will move to the right since the force from the spring 234 will dominate and the land 228 will partially restrict or completely close the port joined to the coupling supply line 204. When the pressure acting on limit valve land 230 builds up again, the limit valve 226 will reopen the coupling supply line port and commence supplying the coupling feed line 236. An exhaust port 238 communicates with the port for the coupling feed line 236 when the limit valve 226 is in a position slightly to the right of that shown and furnishes one of several ways of draining the coupling 62, the other ways will become apparent.

Coupling Exhaust Rate Valve

The coupling 62 is continuously exhausted for cooling purposes but at different rates determined by whether the coupling 62 is functioning as a clutch or a brake. This is accomplished by a coupling exhaust rate valve 240 mounted in one of the bores in the rotatable valve body 94 and depicted in FIGURE 2 just to the left of the limit valve 226. The valve 240 may be arranged so as to be revolvable with a part of the coupling 62 if the calibration requires this. Lands 242 and 244 are formed on the valve 240, and the valve is arranged so that centrifugal force will urge the valve 240 to the left against the opposing bias from a spring 245. A cup-shaped plug 246 is slidable in the left end of the bore to the extent permitted by a stop 247 and partially encloses the end of spring 245.

Once the coupling 62 is filled and is operating as a clutch, assuming the rotatable valve body 94 is being revolved above a selected speed, centrifugal force will move the coupling exhaust rate valve 240 to the left against stop 247 so that lands 242 and 244 will align a port for a coupling bleed line 248 with an exhaust port 249. The coupling bleed line 248 communicates with the interior of the coupling 62 and has therein an orifice 250 so that fluid will be continuously circulated through the coupling 62 at a rate determined thereby, while the pressure therein is maintained adequate for the coupling 62 to perform properly as a clutch.

A coupling rim exhaust line 252 extends between a rim portion of the coupling 62 and the right end of the coupling exhaust rate valve 240 and is appropriately restricted as required. The pressure in this rim exhaust line 252 also will exert a leftward force, this force varying with the centrifugal head in the coupling 62. Since the valve 240 is in its leftmost position, a branch 254 of the rim exhaust line 252 is blocked by valve land 240 relative to exhaust port 249.

To establish a different rate of discharge for brake operation, a coupling signal pressure is transferred by a coupling signal line 258 to the left end area of the cup-shaped plugs 246. The force from this pressure will move the valve 240 to the position shown until at some selected speed, centrifugal force acting in the opposite direction will be adequate to shift the valve 240 to the regulating position. In this position, fluid pressure in branch 254 of rim exhaust line 252 will be relieved through exhaust port 249 and the valve 240 will regulate the pressure in the coupling 62 as determined by the proportions between the spring force, centrifugal force, and the pressure at the rim of the coupling 62 acting via line 252 on the right end of the valve 240. Consequently, as the speed of the body 94 increases, the exhaust port 249 will be opened wider so as to increase the exhaust rate for the additional cooling. Eventually, if the speed is high enough, the regulating pressure will approximate zero with fluid flowing through the coupling 62 at a maximum rate with no pressure except for that due to flow.

Lock-up Clutch Valve

Engagement of the lock-up clutch 68 by the lock-up servo motor 70 is controlled by a lock-up clutch valve 260, viewed in the top left part of FIGURE 4. The lock-up clutch valve 260 has two lands 262 and 264 and is arranged to be moved to the left, as viewed by centrifugal force against the opposition from secondary throttle pressure delivered to the left end area by branches 266 of the secondary throttle supply line 166. Output from the lock-up clutch valve 260 is via a lock-up clutch supply line 268 to the servo motor 70 while input is from a lock-up clutch signal line 270.

Branches 272 of the lock-up clutch signal line 270 communicate through a discriminator or relay valve 274 with a branch 276 of the coupling feed line 236. Therefore, when the coupling 62 is being supplied fluid pressure and the discriminator valve 274 is in a position permitting transfer of this fluid pressure to the lock-up signal line 270, the lock-up clutch valve 260 will commence operation, i.e., the lock-up clutch valve 260 will be moved to the left by the fluid pressure if sufficient, acting on the end of land 264 until land 262 opens the port connected to the lock-up clutch signal line 270. Fluid pressure then will be transferred by the lock-up clutch supply line 268 to the lock-up clutch servo motor 70. When the lock-up clutch valve 260 is in the extreme right position, the lands 262 and 264 align the port connected to the lock-up clutch supply line 268 and an exhaust port 278 so that the servo motor 70 is relieved. By this arrangement the lock-up clutch 68 can only be engaged after the pressure in the fluid coupling 62 has attained a certain value sufficient to move the lock-up clutch valve 260 to the left and to the operative position.

Discriminator Valve

The discriminator valve 274 is also movable in a bore in the revolvable valve body 94 and is provided with spaced lands 279, 280, and 282. The discriminator valve 274 is biased to the left by secondary throttle pressure delivered to the right end of the valve by branches 284, and when in this position the lands 280 and 282 align the ports connected to the coupling feed line 276 and the lock-up clutch signal line 270 so that the lock-up clutch valve 260 may become effective, as has been explained and as will be described more completely. In this leftmost position of the discriminator valve 274, the coupling signal line 258 communicates with an exhaust port 286 so that this line 258 is relieved and the coupling exhaust rate valve 240 will operate at the slow or low rate mentioned.

When secondary throttle pressure is removed, the discriminator valve 274 is so arranged that centrifugal force may move the valve 274 to the extreme rightmost position. Then, the lock-up clutch signal line 270 will be relieved to an exhaust port 288 and the lock-up clutch valve 260 cannot become operative since the lock-up clutch signal line 270 is open to exhaust. Lands 279 and 280 will establish communication between the coupling signal line 258 and the coupling feed line branch 276, whereupon the fluid pressure supplied to the coupling signal line 258 will assist in moving the coupling exhaust rate valve 240 to the aforedescribed brake operation position.

From this description, it can be seen that the discriminator valve 274 has two positions, one in which the coupling signal line 258 is supplied fluid pressure for changing the exhaust rate of the coupling 62 and the other in which fluid pressure is supplied to the lock-up clutch valve 260 which, in turn, permits transferral of fluid pressure, when of a predetermined pressure, to the lock-up clutch servo motor 70.

Coupling Dump Valves

The fluid coupling 62 is provided with one or more coupling dump valves 290 as shown in FIGURE 2. These coupling dump valves 290 are the subject of another application S.N. 477,682 to Cheek, filed December 27, 1954, now Patent No. 2,916,881 issued December 15, 1959, and entitled "Control Fluid Coupling," do not constitute a part of this invention. However, for explanation purposes, it is believed suffice to mention that each of the coupling dump valves 290 are provided with a flanged head portion 292 and that each is movable in a slideway provided in the coupling pump 64. A branch 284 of the coupling feed line 236 communicates with the top of the coupling dump valves 290 defined by the flanged head portion 292; hence, when fluid pressure is being supplied to the coupling 62, this same pressure will force the coupling dump valves 290 downwardly so as to close a cross-exhaust passage 296 extending from the coupling interior to the exterior of the coupling 62. An opposing bias from a spring 298 and the effect from centrifugal force tend to hold the coupling dump valves 290 in their illustrated position. As soon as the supply of fluid pressure to the coupling is cut off, the spring 298 and the centrifugal force will force the coupling dump valves 290 back to the exhaust position opening the cross-exhaust passage 296 and the fluid coupling 62 can drain therethrough.

OPERATION

The operation of the control system relative to the FIGURE 2 transmission will now be described in the sequence taking place when the manual selector valve 96 is moved from the left to the right, i.e., from the Park setting to the Reverse setting.

Park and Neutral

Preferably, the vehicle engine can only be started when the manual selector valve 96 is in either the Park or Neutral setting. When in the Park setting appropriate linkage, or the equivalent, connected to the selector valve 96, is arranged so as to actuate a dog or pawl member (not shown) that engages a part of the load shaft 12 or an element connected thereto for rotation therewith in a known way and affords a positive lock for preventing vehicle movement.

As soon as the engine is started, the pump 86 will become effective and deliver to the main supply line 88 fluid at a pressure determined by the pressure regulator valve 90. Also, pressure fluid will be transferred in any suitable manner at a selected pressure to the torque converter 14 via torque converter supply line 300.

Main line pressure in the main supply line 88 will be delivered by the branch 122 thereof to the primary throttle valve 110 and this valve will become effective to develop a primary throttle pressure in the supply line 124 as soon as the accelerator pedal 118 is depressed a slight amount. If desired, an initial small throttle pressure can be produced by the selection of a properly weighted spring 120.

Another branch 302 of the main supply line delivers fluid pressure both to the detent valve 146 by way of a sub-branch 304 and to the overrun brake valve 130. However, the overrun brake valve lands 136 and 138 block further progress of fluid pressure beyond this point. The detent valve land 148 stops the flow of fluid pressure in the sub-branch 304 of branch 302 beyond the detent valve 146.

Because of the arrangement of the secondary throttle valve 154, previously discussed, the valve 154 when provided with main line pressure by the main supply line 88 will commence regulation and deliver a secondary throttle pressure to the secondary throttle pressure supply line 166 of approximately 35 p.s.i. This secondary throttle pressure will be delivered to the shift valve 190, the discriminator valve 274 via branch 284, the lock-up clutch valve 260 by way of branches 256. As a result, the lock-up clutch valve 260 and the discriminator valve 274 will assume the demonstrated positions while the shift valve 190 will already be moved to the downshift position by the spring 198. If there is any primary throttle pressure present in the primary supply line 124, the action thereof on the stem valve 162 will cause the secondary throttle valve 154 to produce proportionately higher throttle pressure, as has been explained.

With the selector valve 96 in either the Park or Neutral setting, the porting in the bore thereof is so aligned with the port for the main supply line 88 that main line pressure supplied to the governor auxiliary feed line 220, an overrun brake valve control line 306, and a detent valve control line 308. The pressure existing in the overrun brake valve control line 306 and the detent valve control line 308 will, respectively, aid the overrun brake valve spring 140 and the detent valve spring 152 to hold the overrun brake valve 130 and the detent valve 146 in the rightmost positions. As for the governor auxiliary feed line 220, the fluid pressure therein will force the ball check valve 222 open and cause pressure to be supplied to the governor supply line 216.

As has been mentioned, the pressure in the governor supply line 216 will be directed by the branch 217 to the end area of the governor valve land 212. This causes the land 212 to close the port to the governor feed line 220, which is open to exhaust through the bore of the manual selector valve 96 by way of the Drive Range supply line 180. The action of the governor valve 208 is such that the land 210 will crack the exhaust port 218 enough to maintain a minimum pressure in the governor supply line 216 and the action of the ball check valve 222 will aid in this. The constant bleed or exhaust through the exhaust port 218 in the bore of the governor valve 208 does not, as explained, decrease main line pressure because of the restriction 224 upstream of the ball check valve 222. Moreover, the capacity of the pump 86 is selected to maintain the main line pressure with the size of the restriction 224 in mind.

This governor pressure so developed will be delivered to the end area of the overrun brake valve 130 determined by the land 138 but will be unable to remove the overrun brake valve 130 from the viewed position inasmuch as the force of the spring 140 and that of main line pressure delivered by the overrun brake valve signal line 306 are considerably greater. With the overrun brake valve 130 maintained in this position, the lands 134 and 136 will align ports joined to a branch of the governor supply line 216 and a reverse inhibitor supply line 312. This governor pressure then will be delivered to the reverse inhibitor, shown generally at 314.

As depicted, the reverse inhibitor 314 is slidably housed within a body and is biased to the illustrated inoperative position by a spring 316, which abuts a guide or retainer pin 318. The outer end 322 of the reverse inhibitor 314 is provided with a slot 320 in which is received the guide pin 318. When governor pressure is adequate to overcome the spring 316, the outer end 322 will engage some part of the linkage or the manual valve 96, and, in a known manner, prevent movement of the manual selector valve 96 to the Reverse setting.

The reverse inhibitor 314 provides for a situation when the vehicle is in movement with the manual selector valve 96 in the Neutral setting. With rolling speeds of approximately 7 or 8 m.p.h., the centrifugal force acting on the governor valve 208 will cause the exhaust port 218 to be closed enough to produce in the governor supply line 216 an equivalent governor pressure that is adequate to force the reverse inhibitor 314 to the locking position, and therefore, the selector valve 96 cannot be moved to the Reverse setting. As a result, the reverse drive mechanism is protected from possible damage.

In view of the foregoing, only the torque converter 14 is operative in Park and Neutral with the engine running and no torque can be transferred from the torque converter 14 to the load shaft 12 with the forward drive gear unit 40 ineffective, there being no reaction for the gear unit 40 without the forward drive brake 54 and with fluid coupling 62 being emptied.

Drive Range

In the Drive Range setting of the manual selector valve 96, the lands thereon will align the porting as follows: lands 100 and 102 thereon will connect the port to the governor auxiliary feed line 220 with an exhaust port 324 so that this line 220 will be drained and the ball check valve 222 will be maintained closed. Selector valve land 104 will open the port for the Drive Range supply line 180 and main line pressure will be supplied thereto. The overrun brake valve signal line 306 and the detent valve signal line 308 will continue to receive main line pressure.

The fluid pressure now furnished to the Drive Range supply line 180 will be delivered to the forward brake valve 172, whereupon this valve will commence to regulate the pressure delivered to the forward brake supply line 182. The minimum regulated pressure will be the suggested 20 p.s.i. in the absence of any primary throttle pressure in the branch 184 of the primary throttle pressure supply line 124. If primary throttle pressure does exist, the regulated pressure supplied to the forward brake line 182 will be proportionately higher. As explained, the forward brake valve 172 will develop pressure for operating the forward brake servo motor 56 such that the forward drive brake 54 is engaged properly under all throttle openings.

The branch 200 of the Drive Range supply line delivers pressure to the shift valve 190, and since the shift valve 190 is in the downshift position, this pressure fluid will be delivered via the governor feed line 202 to the governor valve 208. The governor valve 208 will operate in the previously described manner developing a governor pressure in the governor supply line 216 that increases as the speed of rotation of the rotatable valve body 94 increases. As mentioned, this governor pressure will be delivered both to the reverse inhibitor 314 and to the overrun brake valve 130. However, the overrun brake valve 130 will still be maintained in the viewed position and the reverse inhibitor 314 will not be moved to the blocking position until a governor pressure equivalent, for exemplary purposes, to 7 or 8 m.p.h. is produced.

Assuming that the engine is idling, the torque delivered by the torque converter 14 through the turbine gear unit 28 and through the forward drive gear unit 40 will not be adequate to revolve the load shaft 12 and start vehicle movement. With the forward drive gear unit 40 set for an underdrive, the transmission is now conditioned for drive in the first or low speed ratio.

Low Speed Ratio

As soon as the engine speed is increased now that the forward drive brake 54 is engaged, drive will be transferred at a reduced speed to the load shaft 12 by the forward drive gear unit 40 and vehicle movement will be commenced. The drive train in the low speed ratio has been previously described, i.e., drive proceeds through the torque converter 14, the turbine gear unit 28 and the forward drive gear unit 40 to the load shaft 12 at a ratio determined by that of the torque converter 14 and turbine gear unit 28 as well as that of the forward drive gear unit 40. The ratio of the torque converter 14 will be established in part by the position of the stator vane 16, and the position of the stator vane 16 will, in turn, be determined by the amount of the primary throttle pressure delivered to the stator control motor 20 by the primary throttle pressure supply line 124. As has been explained, the stator vane 16 can assume an infinite number of positions between high and low angle extreme positions as changes in the relationship between primary throttle pressure and converter charging pressure occurs.

Shift Low to High Speed Ratio

At some predetermined speed with the vehicle proceeding in the low speed ratio, e.g., between 18 and 71 m.p.h. dependent on the position of the accelerator pedal 118, the transmission will upshift to the high speed ratio. This is initiated when the centrifugal force acting on the shift valve 190 is sufficient to overcome the counteracting forces from the spring 198 and secondary throttle pressure delivered by the secondary throttle pressure supply line 166 to the spring end of the shift valve 190. When this happens, the shift valve 190 will move to the depicted position whereupon lands 192 and 194 will permit communication between the branch 200 of the Drive Range supply line 180 and the coupling supply line 204. At the same time the governor feed line 202 will be opened by the shift valve lands 194 and 196 to the exhaust port 207, and the fluid pressure in the coupling supply line 204 will be delivered to the spring end of the governor valve 208. Consequently, the governor valve 208 will be forced to the extreme right position and the pressure in the governor supply line 216 will be relieved via governor feed line 202 to the exhaust port 207. This, in effect, advises the stationary valve body 92 through the agency of the overrun brake valve 130 that the transmission has upshifted, and if the overrun brake 58 had been maintained engaged by the use of governor pressure, the relief of governor pressure makes certain that the overrun brake does not remain engaged and prevent the upshift.

The pressure fluid in the coupling supply line 204 will proceed to the limit valve 226 and via branches 232 to the end area defined by limit valve land 230. This pressure will combine with the centrifugal force acting on valve 226 and shift the limit valve 226 to the left and to the coupling fill position, assuming the pressure being delivered is adequate. In the coupling fill position illustrated, lands 228 and 230 permit communication between the lines 204 and 236, whereupon the fluid pressure in the coupling feed line branch 294 will force the coupling dump valves 290 downwardly so as to close the cross-exhaust passage 296 and then the coupling 62 will commence to fill. If the filling of the coupling 62 reduces the pressure in the coupling supply line 204 too much, the limit valve 226 will close or partially interrupt communication between the coupling supply line 204 and the coupling feed line 236. When the pressure in line 204 builds up again, the valve 226 will re-establish the communication between lines 204 and 236. Therefore, filling of the coupling 62 can never lower the main line pressure to a level that could impair operation. By this arrangement, if the speed of the rotatable valve body 94 is such that the centrifugal force will hold the limit valve 226 in the coupling fill position shown, the pump 86 is being revolved fast enough so that the selected capacity insures adequate output hence enabling the coupling 62 to fill quickly without decreasing main line pressure perceptibly.

With the coupling 62 filled, the forward drive gear unit 40 will be conditioned for the high speed drive and the shift will have been completed. Now the coupling exhaust rate valve 240 will be in the aforedescribed position that permits communication between exhaust port 249 and coupling bleed line 248 so that the resultant exhaust rate will insure circulation for cooling purposes while maintaining a proper charging pressure in the coupling 62.

Since the discriminator valve 274 is held in the depicted position by secondary throttle pressure, the fluid pressure in the coupling feed line 236 is also transferred via the branch 276 thereof through the bore of the discriminator valve 274 between lands 280 and 282 thereon and to the lock-up clutch signal line 270. Secondary throttle pressure will likewise still maintain the lock-up clutch valve 260 in the illustrated position until the fluid coupling 62 is fully effective. Then, the pressure in the lock-up clutch signal line 270 delivered by branches 272 to the right end area of the lock-up clutch valve 260 will be sufficient to force the lock-up clutch valve 260 to the left until the port connected to the lock-up clutch signal line 270 is open to the port for the lock-up clutch supply line 268, whereupon this fluid pressure will be supplied to the lock-up clutch servo motor 70 and cause the lock-up clutch 68 to be engaged. The lock-up clutch 68 will, as stated, eliminate slippage through the fluid coupling 62 and the forward drive gear unit 40 will provide a true direct drive ratio therethrough. In high speed drive the overall ratio will be substantially a direct one except for the slippage through the converter 14 now that the lock-up clutch 68 is engaged. Prior to this time, of course, the slippage through both the coupling 62 and the torque converter 14 influenced the overall speed ratio.

*Detent High Speed to Low Speed Ratio*

At some speed below the predetermined maximum of 71 m.p.h. suggested, with the vehicle proceeding in the high speed ratio, a downshift can be enforced by depressing the accelerator pedal 118 beyond the full throttle position and to a so-called "detent" position. When this happens, an accelerator pedal operated switch 326 is closed so as to complete a detent relay circuit, shown generally at 328. The completion of the circuit 328 causes a voltage source, such as the vehicle battery 330 grounded at 332, to be joined to windings for a detent relay 334 grounded at 336. With the detent relay 334 energized the armature end 338 and connected valve element 340 are moved upwardly against the opposing bias from a spring 342. This upward movement opens a branch 344 of the detent valve signal line 308 to exhaust whereupon the pressure acting on the spring end of the detent valve 146 is relieved. Now, only the bias from the spring 152 holds the detent valve 146 in the rightmost position thereof.

A restriction 346 downstream from the branch 344 functions like the restriction 224 in the governor auxiliary feed line and that is to prevent the pressure in the system from being reduced by this exhausting of the pressure through the valve element 340. Again, as mentioned, the output from the pump 86 will be adequate to maintain the main line pressure of 100 p.s.i. when this bleed is effective.

When the accelerator pedal 118 is moved to the detent position, the effect on the primary throttle valve 110 causes primary throttle pressure in the primary throttle pressure supply line 124 to become equivalent to main line pressure and this maximum primary throttle pressure is delivered via a branch 347 of the primary throttle pressure supply line to the right end area of the detent valve 146. As a result, the detent valve 146 will be forced to the downshift or detent position, the spring 152 being inadequate to prevent this, so that lands 148 and 150 thereon will establish communication between branch 304 of the main supply line 88 and a downshift line 348 extending to the secondary throttle valve 154. Main line pressure then will force the secondary throttle valve 154 to the left and the maximum pressure position with the result that secondary throttle pressure delivered to the supply line 166 also becomes 100 p.s.i.

With secondary throttle pressure now equivalent to main line pressure, a shift valve 190 will be forced by this pressure to the downshift position and the lands 192 and 194 thereon will connect the coupling supply line 204 to exhaust port 206 and lands 194 and 196 will again establish communication between the branch 200 of the Drive Range supply line 180 and the governor feed line 202. The governor valve 208 will again become effective to produce governor pressure. With the coupling supply line 204 exhausted, the coupling 62 will be drained quickly in three ways. First, the coupling feed line 236 will drain either through the exhaust port 238 in the bore of the limit valve 226, if the speed of the rotatable valve body is such that the spring 234 will move the limit valve 226 to the right so as to open the exhaust port 238 or, if the speed is above this, through the exhaust port 206 in the bore of the shift valve 190. Second, the relief of this coupling feed line 236 will also relieve the branch 294 to the top of the coupling dump valves 290 and immediately centrifugal force and the spring 298 will move the coupling dump valves 290 to the open position and fluid within the coupling 62 will be forced from the coupling 62 through the cross-exhaust passage 296 to the exterior of the coupling. Third, the coupling exhaust rate valve 240 will aid in draining the coupling 62 through exhaust port 249.

As soon as the coupling feed line 236 is relieved, the branch 276 and also the lock-up clutch signal line 270 are relieved, and of course, the lock-up clutch valve 260 will be moved back to the demonstrated position and the lock-up clutch servo motor 70 drained via the lock-up clutch supply line 268 to the exhaust port 278 in the bore of the lock-up clutch valve 260. This insures that the lock-up clutch 68 is disengaged.

As the fluid coupling 62 loses its effectiveness the one-way device 52 and the forward drive brake 54 will become again operative to prevent backward rotation of the forward unit reaction sun gear 46. The forward drive gear unit 40 will again operate as a reduction unit and the transmission will proceed in the low speed ratio enabling the driver to accelerate rapidly. Contributing to this acceleration ability is the torque converter 14 since maximum primary throttle pressure will force stator vane 16 to the high angle high performance position in the described way causing the converter 14 to offer maximum multiplication.

*Forced High Speed to Low Speed Ratio Shift*

If the vehicle is proceeding in the high speed ratio at some predetermined maximum speed below the 71 m.p.h. mentioned, it is possible to enforce a downshift to the low speed ratio without depressing the accelerator pedal 118 all the way to the detent position. This is accomplished by depressing the accelerator pedal 118 far enough, e.g., to the full throttle position so that the resultant primary throttle pressure developed will, in turn, cause the secondary throttle valve 154 to produce a secondary throttle pressure that, if adequate, will overcome centrifugal force acting on the shift valve 190 and force it to the downshift position. Then, the transmission will downshift in the aforedescribed manner. As before, the converter ratio will be determined by primary throttle pressure and the position of the stator vane 16 established thereby.

*Closed Throttle Downshifts*

When the accelerator pedal 118 is released and the vehicle is allowed to slow down while in the high speed ratio, a speed will be reached where the secondary throttle pressure of 35 p.s.i. acting on the shift valve 190, there being no primary throttle pressure, and the shift valve spring 198 will together be capable of overcoming the opposing forces from the centrifugal effect on the valve 190 and from the pressure acting on the differential areas between lands 192 and 194. The shift valve 190, then, will move to the downshift position, and the transmission will change to the low speed ratio in the same manner as described during the explanation of the detent downshift.

Because the fluid pressure in the bore of the shift valve 190 acts on the differential areas of the lands 192 and 194, the resultant force is towards the upshift direction of the shift valve 190. This force towards the upshift direction produces what is commonly referred to as a hysteresis effect. Since such a differential area was not a factor in determining the upshift point, then, on the downshift the speed of the vehicle will have to fall below the upshift speed. For instance, if the transmission upshifts at 18 m.p.h. with a closed throttle, vehicle speed may have to decrease to say 14 m.p.h. before the downshift will occur. This eliminates the possibility of "hunting," i.e., alternate up and downshifting, occurring once the transmission is upshifted and the speed is kept relatively constant at 18 m.p.h.

Manual High Speed to Low Speed Shift

This downshift is produced by moving the manual selector valve 96 from the Drive Range setting to the Intermediate Range setting when vehicle speed is less than 71 m.p.h. and will be apparent from the following description of Intermediate Range operation.

Intermediate Range

The purpose of the Intermediae Range has already been mentioned and that is to enable the operator to keep the transmission in the low speed ratio so as to utilize the additional torque available if moderate engine braking is wanted to slow the vehicle. To establish this Range, the manual selector valve 96 is placed in the Intermediate Range setting with the result that lands 102 and 104 are aligned to permit communication between the main supply line 88 and an Intermediate Range cross-line 350; lands 100 and 102 connect, in addition to the governor auxiliary feed line 220, the overrun brake valve signal line 306 to the exhaust port 324 in the bore of the selector valve 96; and lands 98 and 100 establish communication between the Intermediate Range cross-line 350 and the Intermediate Range supply line 352.

The fluid pressure in the Intermediate Range supply line 352 is transferred to the detent valve 146 and with the detent valve 146 in the rightmost position will proceed between lands 148 and 150 through downshift line 348 and to the secondary throttle valve 154. As with a detent downshift, fluid pressure delivered by the downshift line 348 will force the secondary throttle valve 154 to the left far enough for unrestricted communication between the main supply line 88 and the secondary throttle pressure supply line 166. Secondary throttle pressure, then, will be equivalent to main line pressure and will maintain the shift valve 190 in the downshift position until the suggested 71 m.p.h. is exceeded. If the manual selector valve 96 is moved from the Drive Range setting to the Intermediate Range setting, a manual downshift will take place since the secondary throttle pressure will force the shift valve 190 to the downshift position. With the shift valve 190 in the downshift position, both the fluid coupling 62 and the lock-up clutch 68 are kept inoperative.

When the fluid pressure in the overrun brake valve signal line 306 is exhausted, governor pressure can, at approximately 4 to 5 m.p.h., move the overrun brake valve 130 to the left in which position lands 134 and 136 will connect the overrun brake supply line 144 to the branch 310 of the governor supply line 216. The overrun brake servo 60 will be energized and the overrun brake 58 engaged so that the forward unit reaction sun gear 46 is restrained from rotation in either direction but particularly in the forward direction. The 4 to 5 m.p.h. speed selected for commencement of the engagement of the overrun brake 58 may be varied as desired; however, below these speeds the additional braking afforded by the overrun brake 58 generally would not be needed. Moreover, governor pressure at 4 to 5 m.p.h. is adequate to cause the overrun brake servo motor 60 to hold the overrun brake 58 engaged with the braking loads that would be encountered at these speeds. Of course, as vehicle speed builds up, governor pressure builds up so as to increase the capacity of the overrun brake 58.

It should be noted that primary throttle pressure is delivered to the end of plug valve 142 and may aid governor pressure in moving the overrun brake valve 130 to the position for energizing the overrun brake 58. This use of primary throttle pressure is for another purpose to be described and does not interfere with the operation of the overrun brake 58.

The overrun brake valve 130 when moved to the left will also connect through lands 136 and 138 of branch 302 of the main supply line 88 with the reverse inhibitor supply line 312. This connection provides main line pressure in place of governor pressure and insures that the reverse inhibitor 314 is kept operative to prevent the driver from placing the manual selector valve 96 in the Reverse setting.

To summarize, in Intermediate Range the driver can proceed in the low speed ratio as in Drive Range up to 71 m.p.h. When the accelerator pedal 118 is released so that the vehicle starts to coast and drive is from the load shaft 12, the prevention of rotation of the reaction sun gear 46 in the forward direction causes the forward drive unit ring gear 44 to be overdriven. As explained, the engine resists this with the result that greater braking resistance is afforded in the Intermediate Range than in the Drive Range. When the vehicle speed exceeds 71 m.p.h., the shift valve 190 will upshift. Consequently, the fluid coupling 62 and lock-up clutch 68 will become operative, and the governor valve 208 will become inoperative to produce governor pressure as in Drive Range so that the overrun brake 58 will disengage. As soon as the driver allows the vehicle to slow to below 71 m.p.h., the overrun brake 58 will be re-engaged and engine braking made again available.

Drive Brake Range

As mentioned, the Drive Brake Range offers greater coast braking than provided in Intermediate Range and is established by moving the manual selector valve 96 to the right in the next setting so as to commence operation in the Drive Brake Range. With the manual selector valve 96 in this setting, lands 102 and 104 will place the main supply line 88 in communication with a Drive Brake Range cross-line 354; lands 100 and 102 will open the detent valve signal line 308 also to the exhaust port 324; and lands 98 and 100 will establish communication between the Drive Brake Range cross-line 354 and the Drive Brake Range supply line 356. In this setting the land 98 will uncover the Intermediate Range supply line 352 so as to permit this line 352 to drain through the exhaust port 358 in the left end of the bore for the manual selector valve 96.

The fluid pressure in the Drive Brake Range supply line 356 is transferred to the left end area of the single land plug valve 160 in the bore for the secondary throttle valve 154 and will force the secondary throttle valve 154 to the inoperative position, the result being that secondary throttle pressure existing in the line 166 will be drained out the exhaust port 170 and the pressure in the line 166 will become zero. A branch 360 of the Drive Brake Range supply line 356 extends to the overrun brake valve 130 and with the overrun brake valve 130 in the position viewed will proceed between lands 132 and 134 thereof through the overrun brake supply line 144 to the overrun brake servo motor 60 and engage the overrun brake 58.

Since there is no secondary throttle pressure acting to hold the shift valve 190 in the downshift position, the shift valve 190 at a selected minimum speed will upshift and commence to supply fluid pressure to the fluid coupling 62 in the manner previously described. It is intended that the shift valve 190 should upshift before the governor valve 208 can produce a pressure that would move the overrun brake valve 130 to the left. However, it should be kept in mind that the Drive Brake Range is normally initiated when the vehicle is coasting at relatively rapid speeds and considerable braking is needed.

With the fluid coupling filled and because there is the lack of secondary throttle pressure, the discriminator valve 274 will have been moved to the right by centrifugal force acting thereon; therefore, the coupling feed line branch 276 will be placed in communication with the coupling signal line 258 by the lands 279 and 280 on the discriminator valve 274 while lock-up clutch signal line 270 is opened by lands 280 and 282 to exhaust port 288 insuring that the lock-up clutch 68 does not engage. The pressure in the coupling signal line 258 will shift the coupling exhaust rate valve 240 to the previously explained brake operation position. The faster rate of discharge will be available for additional cooling when the fluid coupling 62 is performing as a brake because the churning of the fluid generates considerably more heat than when functioning as a clutch.

Now the transmission is conditioned for maximum braking, the total being, as previously discussed, the sum of the resistances from the engine and the coupling 62 functioning as a brake.

This range of braking, as stated, is not intended for normal forward driving. Therefore, provision, based on accelerator pedal position, is made to protect the transmission from abuses or negligence on the part of the operator. Since the accelerator pedal 118 must be depressed for the engine to start forward drive, then whenever the accelerator pedal 118 is depressed beyond a predetermined position, the equivalent primary throttle pressure in acting on the plug valve 142 positioned at the end of the overrun brake valve 130 will be sufficient to force the overrun brake valve 130 to the left and interrupt communication between the overrun brake supply line 144 and the Drive Brake Range supply line branch 360. When this happens, the overrun brake 58 is disengaged, and with the coupling 62 filled, the transmission will be conditioned for high speed drive. As soon as the accelerator pedal is released, the braking will again be available.

Reverse

In the Reverse setting of the manual selector valve 96, lands 102 and 104 are positioned, respectively, to the right of the port in communication with the main supply line 88 and to the right of an exhaust port 362; lands 100 and 102 establish communication between the main supply line 88 and a Reverse supply line 364 as well as the governor auxiliary feed line 220, detent valve signal line 308, and overrun brake signal line 306; and lands 98 and 100 align the Drive Brake cross-line 354 with exhaust port 362. Consequently, only the lines between lands 100 and 102 are provided with fluid pressure so that the detent valve 146 and the overrun brake valve 130 are maintained in their respective rightmost positions as in Drive Range.

Since the Drive Range supply line 180 is exhausted via exhaust port 362, the shift valve 190 is ineffective. Hence, the supply of fluid pressure to the governor valve 208 via the shift valve 190 is cut off, and the secondary source from the governor auxiliary feed line 220 is again utilized as in Neutral. In the same manner, then, a governor pressure may be developed to act on the reverse inhibitor 314 and if the vehicle is rolling or moving at 7 to 8 m.p.h., the reverse inhibitor 314 will prevent the manual selector valve 96 from being placed in the Reverse setting. This, as explained, protects the transmission against possible damage.

Because the Drive Range supply line 180 extends to the forward brake valve 172 and supplies the forward drive brake servo motor 56 with operating pressure, the exhausting of the line 180 will cause the forward drive brake 54 to be disengaged thereby rendering the forward drive gear unit 40 ineffective to transfer torque. Drive, then, is from the power shaft 10 through the torque converter 14, the turbine gear unit 28, and to the reverse unit input sun gear 78. With the reverse drive brake servo motor 84 being fluid actuated by the fluid pressure in the reverse drive supply line 364, the reverse drive brake 82 will be engaged to hold reaction ring gear 80. Consequently, forward rotation of the sun gear 78 will cause the output carrier 72 and the load shaft 12 to be revolved backwards at a speed less than that of the sun gear 78.

Exhaust of the System

When the vehicle is brought to rest, the engine stopped, and the manual selector valve 96 placed in either the Park or Neutral setting, the torque converter 14 may be drained in any suitable way. The fluid coupling 62 can drain, as explained before, namely, through the coupling exhaust rate valve bore and the air vent 252, through the exhaust port 278 in the bore of the limit valve 226, and if one or more of the coupling dump valves 290 are below the fluid line of the coupling 62, then through these valves 290. Exhaust of the lock-up clutch servo motor 70 is through the bore of the lock-up clutch valve 260 and to the exhaust port 278. Both the forward drive brake servo motor 56 and the reverse drive brake servo motor 84 are drained through the manual valve bore, the reverse brake supply line 364 communicating with the exhaust port 324 and the Drive Range supply line 180 connecting, through the forward brake valve 172, the forward brake supply line 182 with the exhaust port 362. Drain of the overrun brake servo motor 60 is via the overrun brake supply line 144, Drive Brake Range supply line branch 360, Drive Brake Range supply line 356 and the exhaust port 324 in the bore of the manual selector valve 96.

Modifications

Both of the transmissions depicted diagrammatically in FIGURES 5 and 6 are modifications of the FIGURE 2 transmission and incorporate features not included in the FIGURE 2 transmission. Consequently, the parts of each that are identical with those of the FIGURE 2 transmission have been assigned the same numerals as the FIGURE 2 transmission. In FIGURE 5, the rearranged parts have a prime added to the number and those in FIGURE 6 a double prime.

In the FIGURE 5 transmission a fluid coupling 62' is arranged differently from the FIGURE 2 coupling 62 with relation to the drive train. As seen, the coupling 62' has a pump 64' joined directly to the power shaft 10 and a rotor 66' joined as in FIGURE 2 to the forward drive unit reaction sun gear 46. Therefore, when the fluid coupling 62' is functioning as a clutch, a split torque drive results with part of the torque proceeding directly to the torque converter 14 from the power shaft 10 and the remaining portion through the coupling 62' and to the reaction sun gear 46. In this way since only part of the torque proceeds through the torque converter 14, and the losses through the torque converter 14 have less influence on the overall efficiency.

Since the drive to the forward drive unit 40 comes both from the torque converter 14 and the fluid coupling 62' the fluid losses through both will influence the high speed drive ratio. Moreover, the low speed drive ratio and drive train will be the same as with the FIGURE 2 transmission provided the gear unit 40 and the converter 14 have the same ratios. If a lock-up clutch is installed in the same way as in the FIGURE 2 transmission, then the high speed drive ratio would be closer to a 1 to 1 ratio with the FIGURE 5 transmission than the FIGURE 2 transmission since there would be no fluid losses through the coupling 62' and those through the torque converter 14 would be considerably reduced.

When the coupling 62' is performing as a brake and the rotor 66' is held by the overrun brake 58, rotation of the power shaft 10 is resisted by the churn braking effect and this resistance will supplement the ability of the engine to resist being overdriven by the forward drive gear unit 40 during coast. In this way, if the engine does not offer enough resistance for the desired braking, the coupling 62' will insure that braking is adequate.

The control system for the FIGURE 2 transmission can be used for the FIGURE 5 transmission in the same way as presented. However, if a lock-up clutch is not included, the lock-up clutch valve 260 may be removed from the system and the lines thereto blocked.

The FIGURE 6 transmission shows still another arrangement of a fluid coupling, denoted by the numeral 62", and also has a different reverse drive gear unit, shown at 80". The fluid coupling 62" has the pump 64" joined directly to the load shaft 12 and the rotor 66″ joined to the reaction sun gear 46 for the forward drive gear unit 40. When the coupling 62″ is functioning as a clutch, the forward drive unit carrier 48 and the reaction sun gear 46 are tied or clutched together, whereas in FIGURE 2 the ring gear 44 is clutched to the reaction sun gear 46 by the coupling 62. Hence, the low speed ratio and the high speed ratio will be substantially the same as the FIGURE 2 transmission, the only difference being the required capacity for the two couplings. In the high speed drive the coupling 62″ will afford the same ratio as in the FIGURE 2 transmission, the ratio being substantially a direct drive except for slippage through the coupling 62″ and the converter 14 as with the FIGURE 2 transmission. With the lock-up clutch 68 engaged, the ratio in high speed, of course, will be identical to that in the FIGURE 2 transmission.

With the coupling 62″ functioning as a brake, rotation of the load shaft 12 is resisted directly. This is different from the FIGURE 2 transmission, which resists overspeeding of the forward gear unit ring gear 44, and the FIGURE 5 transmission, which resists rotation of the power shaft 10. However, in each it is the rotation of the load shaft 12 during coast that is resisted both by the engine and by the ground connection provided by the coupling when functioning as a brake.

The FIGURE 6 transmission reverse gear unit 42″ has a ring gear 80″ joined to the forward gear unit carrier 48, an input sun gear 78″ joined to the forward drive gear unit input ring gear 44, and a planet carrier 72″ arranged to perform as a reaction member and provided with a series of planet pinions 74″ revolvably supported thereon so as to intermesh with the ring and sun gears 80″ and 78″. With this construction when the reaction carrier 72″ is held stationary by a reverse drive brake 82″, arranged to be engaged by a fluid actuated servo motor 84″, forward rotation of the input sun gear 78″ will cause the output ring gear 80″ to be revolved backwards at a reduced speed determined by the proportions between the sun gear 78″ and ring gear 80″. This reverse drive gear unit 42″ only employs one set of planet pinions 74″, and therefore, the carrier 72″ must be held for the reverse rotation, whereas the FIGURES 2 and 5 reverse drive gear units 42 have two sets of planet pinions, which permits the ring gear 80 to be held for a reverse drive.

As with the FIGURE 5 transmission the control system for the FIGURE 2 transmission may be used with the FIGURE 6 transmission in the same manner.

From the foregoing it can be seen that each of the transmissions employs a fluid coupling that can function both as a brake and as a clutch. When functioning as a clutch, the coupling produces a ratio change and when functioning as a brake affords a range of very substantial coast braking resistance. Also another range of low speed operation, as well as moderate braking, is available so that the operator has operating ranges for all conditions requiring braking. The control system for the transmission uses a minimum number of valves, this being possible by combining the functions of some of these valves and by revolving one of the valve bodies to obtain the speed responsive influence needed for accurate control.

The invention is to be limited only by the following claims.

We claim:

1. In a transmission, the combination of power and load members, a first hydrodynamic torque transmitting device having an impeller driven by the power member and a plurality of turbines, means for intergearing the turbines, gearing means for transferring drive between the turbines and the load member in variable forward drive ratios and a reverse drive ratio, a second hydrodynamic torque transmitting device having plural rotors coacting with the gearing means when the power member is driving so as to afford a substantially direct drive ratio through the gearing means, means causing one of the rotors to be braked so that the second torque transmitting device functions as a brake when the load member is driving and resists rotation of the load member, and means rendering the second torque transmitting device inoperative as a brake when the power member assumes the drive from the load member.

2. In a transmission, the combination of power and load members, a first hydrodynamic torque transmitting device having an impeller driven by the power member and a plurality of turbines, means for intergearing the turbines, gearing means for transferring drive between the turbines and the load member in variable forward drive ratios and a reverse drive ratio, and a second hydrodynamic torque transmitting device having plural rotors coacting with the gearing means when the power member is driving so as to afford a substantially direct drive ratio through the gearing means, means braking one of rotors so as to cause the second torque transmitting device to function as a brake when the load member is driving and resist rotation of the load member, clutch means for locking up the second device when the power member is driving so as to eliminate fluid slippage in the second device, and means rendering the clutch means effective only after the second hydrodynamic torque transmitting device is operable.

3. In a transmission, the combination of power and load shafts, a torque converter comprising an impeller driven by the power shaft, a plurality of turbines and a variable position stator, control means for altering the position of the stator, means for intergearing the turbines, additional gearing means for transferring drive between the turbines and the load shaft in a plurality of forward drive ratios and a reverse drive ratio, a plural rotor fluid coupling coacting with the additional gearing means when the power shaft is driving so as to afford a substantially direct drive ratio through the additional gearing means, and means braking one of the fluid coupling rotors so as to cause the fluid coupling to function as a brake when the load shaft is driving and resist rotation of the load shaft.

4. In an engine driven transmission, the combination of a power shaft revolvable by the engine, a load shaft, a hydrodynamic torque transmitting device having an impeller driven by the power shaft and a plurality of turbines, planetary gearing for transferring drive between the turbines and the load shaft in a plurality of forward drive ratios and a reverse drive ratio, the planetary gearing comprising first and secondary planetary gear units each including input, output, and reaction elements, the first gear unit having the input element thereof drive connected to one of the turbines and the output element thereof arranged so as to connect another one of the turbines with the second gear unit input element, the second gear unit having the output element thereof joined to the load shaft, brake means for preventing rotation of the first and second gear unit reaction elements in one direction so as to render each gear unit effective to transfer drive, and a device, means for causing said device to coact with the second gear unit in forward drive when the power shaft is driving so as to afford a substantially direct drive ratio therethrough and in coast drive when the load shaft is driving to also resist rotation of the load shaft.

5. In an engine driven transmission, the combination of a power shaft revolvable by the engine, a load shaft, a hydrodynamic torque transmitting device having an impeller driven by the power shaft and a plurality of turbines, planetary gearing for transferring drive between the turbines and the load shaft at a plurality of forward drive ratios and a reverse drive ratio, the planetary gearing comprising first and secondary planetary gear units each including input, output, and reaction elements, the first gear unit having the input element thereof drive connected to one of the turbines and the output element thereof arranged so as to connect another one of the turbines with the second gear unit input element, the second gear unit having the output element thereof joined to the load shaft, first and second gear unit brakes for preventing rotation of the respective gear unit reaction elements in one direction so as to render each gear unit effective to transfer drive, a second hydrodynamic torque transmitting device having a pump member revolvable at a speed proportional to the speed of one of the shafts and a rotor joined to the reaction element of the second gear unit, the second hydrodynamic torque transmitting device being arranged to be emptied and filled with fluid so that when filled and when the power shaft is driving a high speed drive ratio is afforded through the gearing, and overrun braking means for holding both the second gear unit reaction element and the second device rotor against rotation in either direction when the load shaft is driving during coast so that the second hydrodynamic torque transmitting device offers braking resistance to rotation of the load shaft.

6. In an engine driven transmission; the combination of a power shaft revolvable by the engine; a load shaft; a first hydrodynamic torque transmitting device having an impeller revolvable with the power shaft and a plurality of turbines; planetary gearing for transferring drive between the turbines and the load shaft in a plurality of forward drive ratios and a reverse drive ratio, the planetary gearing comprising turbine, forward drive, and reverse drive gear units; the turbine and forward drive gear units each including a reaction gear, an input gear, and an output planet carrier having a plurality of planet pinions journaled thereon so as to intermesh with the input and reaction gears; the turbine gear unit having the input gear joined to one of the turbines and the output carrier arranged to connect another of the turbines with the forward drive gear unit input gear; the forward drive gear unit having the output carrier joined to the load shaft; the reverse drive gear unit having an input element drive connected to the turbine gear unit output carrier, an output element drive connected to the load shaft, and a reaction element; a turbine gear unit brake for preventing rotation of the turbine gear unit reaction gear in one direction; a forward drive brake for preventing rotation of the forward drive gear unit reaction gear in one direction so as to provide one forward drive ratio therethrough; a reverse drive brake for preventing rotation of the reverse gear unit reaction element so as to cause the load shaft to be revolved backwards; and a second hydrodynamic torque transmitting device coacting with the forward drive gear unit; the second hydrodynamic torque transmitting device being arranged to be emptied and filled with fluid so that when filled and when the power shaft is driving the forward drive gear unit is conditioned for another forward drive ratio and when filled and when the load shaft is driving the second hydrodynamic device functions as a brake so as to resist rotation of the load shaft.

7. In an engine driven transmission, the combination of a power shaft revolvable by the engine, a load shaft, a hydrodynamic torque transmitting device having an impeller driven by the power shaft and a plurality of turbines, planetary gearing for transferring drive between the turbines and the load shaft at a plurality of forward drive ratios and a reverse drive ratio, the planetary gearing comprising first and secondary planetary gear units each including input, output, and reaction elements, the first gear unit having the input element thereof drive connected to one of the turbines and the output element thereof arranged so as to connect another one of the turbines with the second gear unit input element, the second gear unit having the output element thereof joined to the load shaft, first and second gear unit brakes for preventing rotation of the respective gear unit reaction elements in one direction so as to render each gear unit effective to transfer drive, a second hydrodynamic torque transmitting device having a pump member revolvable at a speed proportional to the speed of one of the shafts and a rotor joined to the reaction element of the second gear unit, the second hydrodynamic torque transmitting device being arranged to be emptied and filled with fluid so that when filled and when the power shaft is driving a high speed drive ratio is afforded through the gearing, overrun braking means for holding both the second gear reaction element and the second device rotor against rotation in either direction when the load shaft is driving during coast so that the second hydrodynamic torque transmitting device offers braking resistance to rotation of the load shaft, and a lock-up clutch for clutching together the second device pump and rotor members so as to prevent slippage therebetween.

8. In an engine driven transmission; the combination of a power shaft revolvable by the engine; a wheel driving load shaft; a first hydrodynamic torque transmitting device having an impeller revolvable with the power shaft and a plurality of turbines; planetary gearing for transferring drive between the turbines and the load shaft in a plurality of forward drive ratios; the planetary gearing comprising turbine and forward drive gear units each including a reaction gear, an input gear, and an output planet carrier having a plurality of planet pinions journaled thereon so as to intermesh with the input and reaction gears; the turbine gear unit having the input gear joined to one of the turbines and the output carrier arranged to connect another of the plurality of turbines with the forward drive gear unit input gear; the forward drive gear unit having the output carrier joined to the load shaft; a turbine gear unit brake for preventing rotation of the turbine gear unit reaction gear in one direction; a forward drive brake for preventing rotation of the forward drive gear unit reaction gear in one direction so as to provide one forward drive ratio therethrough; a second hydrodynamic torque transmitting device comprising a pump drive connected to the load shaft and a rotor drive connected to the forward drive gear unit reaction gear; the second torque transmitting device being arranged to be emptied and filled with fluid so that when filled with fluid and when the power shaft is driving the forward drive gear unit is conditioned for a direct drive ratio; an overrun brake for holding the second device rotor stationary so that when the load shaft is driving rotation of the forward drive gear unit input gear by the load shaft is resisted.

9. In an engine driven transmission; the combination of a power shaft revolvable by the engine; a load shaft; a first hydrodynamic torque transmitting device having an impeller revolvable with the power shaft and a plurality of turbines; planetary gearing for transferring drive between the turbines and the load shaft in a plurality of forward drive ratios and a reverse drive ratio; the planetary gearing comprising turbine, forward drive, and reverse drive gear units; the turbine and forward drive gear units each including a reaction gear, an input gear, and an output planet carrier provided with a plurality of planet pinions revolvably arranged thereon so as to intermesh with the input and reaction gears; the turbine gear unit having the input gear joined to one of the plurality of turbines and the output carrier arranged to connect another of the plurality of turbines with the forward drive gear unit input gear; the forward drive gear unit having the output carrier joined to the load shaft; the reverse gear unit including an input gear drive connected to the turbine gear unit output carrier, an output gear drive connected to the load shaft and a reaction planet carrier having a series of planet pinions journaled thereon so as to intermesh with the reverse drive gear unit input and output gears; a turbine gear unit brake for preventing rotation of the turbine gear unit reaction gear in one direction; a forward drive brake for preventing rotation of the forward gear unit reaction gear in one direction so as to provide one forward drive ratio therethrough; a reverse drive brake for preventing rotation of the first drive gear unit reaction carrier so as to cause the load shaft to be revolved backwards; a second hydrodynamic torque transmitting device comprising a pump drive connected to the load shaft and a rotor drive connected to the forward drive gear unit reaction gear; the second torque transmitting device being arranged to be emptied and filled with fluid so that when filled with fluid and when the power shaft is driving the forward gear unit is conditioned for another forward drive ratio; and an overrun brake for holding the second device rotor stationary so that when the load shaft is driving rotation of the forward drive gear unit input gear by the load shaft is resisted.

10. In an engine driven transmission; the combination of a power shaft revolvable by the engine; a load shaft; a first hydrodynamic torque transmitting device having an impeller revolvable with the power shaft and a plurality of turbines; planetary gearing for transferring drive between the turbines and the load shaft in a plurality of forward drive ratios and a reverse drive ratio; the planetary gearing comprising turbine, forward drive, and reverse drive gear units; the turbine and forward drive gear units each including a reaction gear, an input gear, and an output planet carrier provided with a plurality of planet pinions revolvably arranged thereon so as to intermesh with the input and reaction gears; the turbine gear unit having the input gear joined to one of the turbines and the output carrier arranged to connect another of the turbines with the forward drive gear unit input gear; the forward drive gear unit having the output carrier joined to the load shaft; the reverse gear unit including an input gear drive connected to the turbine gear unit output carrier, an output gear drive connected to the load shaft, and a reaction planet carrier having a series of planet pinions journaled thereon so as to intermesh with the reverse drive gear unit input and output gearing; a turbine gear unit brake for preventing rotation of the turbine gear unit reaction gear in one direction; a forward drive brake for preventing rotation of the forward gear unit reaction gear in one direction so as to provide one forward drive ratio therethrough; a reverse drive brake for preventing rotation of the first drive gear unit reaction carrier so as to cause the load shaft to be revolved backwards; a second hydrodynamic torque transmitting device comprising a pump drive connected to the load shaft and a rotor drive connected to the forward drive gear unit reaction gear; the second torque transmitting device being arranged to be emptied and filled with fluid so that when filled with fluid and when the power shaft is driving the forward gear unit is conditioned for another drive ratio; an overrun brake for holding the second device rotor stationary so that when the load shaft is driving rotation of the forward drive gear unit input gear by the load shaft is resisted; and a lock-up clutch for clutching together the second device pump and the rotor so as to prevent slippage therethrough.

11. In an engine driven transmission; the combination of a power shaft revolvable by the engine; a load shaft; a first hydrodynamic torque transmitting device having an impeller revolvable with the power shaft and a plurality of turbines; planetary gearing for transferring drive between the turbines and the load shaft in a plurality of forward drive ratios and a reverse drive ratio; the planetary gearing comprising turbine and forward drive gear units each including a reaction gear, an input gear, and an output planet carrier having a plurality of planet pinions journaled thereon so as to intermesh with the input and reaction gears; the turbine gear unit having the input gear joined to one of the turbines and the output carrier arranged to connect another of the turbines with the forward drive gear unit input gear, the forward drive gear unit having the output carrier joined to the load shaft; a turbine gear unit brake for preventing rotation of the turbine gear unit reaction gear in one direction; a forward drive brake for preventing rotation of the forward drive gear unit reaction gear in one direction so as to provide one forward drive ratio therethrough; a second hydrodynamic torque transmitting device comprising a pump drive connected to the turbine gear unit output carrier and a rotor drive connected to the forward drive gear unit reaction gear, the second torque transmitting device being arranged to be emptied and filled with fluid so that when filled with fluid and when the power shaft is driving the forward drive gear unit is conditioned for a direct drive ratio; and an overrun brake for holding the second device rotor stationary so that when the load shaft is driving rotation of the forward drive gear unit input gear by the load shaft is resisted.

12. In an engine driven transmission; the combination of a power shaft revolvable by the engine; a load shaft; a first hydrodynamic torque transmitting device having an impeller revolvable with the power shaft and a plurality of turbines; planetary gearing for transferring drive between the turbines and the load shaft and a plurality of forward drive ratios and a reverse drive ratio; the planetary gearing comprising turbine, forward drive, and reverse drive gear units, the turbine and forward drive gear units each including a reaction gear, an input gear, and an output planet carrier having a plurality of planet pinions journaled thereon so as to intermesh with the input and reaction gears; the turbine gear unit having the input gear joined to one of the turbines and the output carrier arranged to connect another of the turbines with the forward drive gear unit input gear; the forward drive gear unit having the output carrier joined to the load shift; the reverse drive gear unit having an input element drive connected to the turbine gear unit output carrier, an output element drive connected to the load shaft, and a reaction element; a turbine gear unit brake for preventing rotation of the turbine gear unit reaction gear in one direction; a forward drive brake for preventing rotation of the forward drive gear unit reaction gear in one direction so as to provide one forward drive ratio therethrough; a reverse drive brake for preventing rotation of the reverse gear unit reaction element so as to cause the load shaft to be revolved backwards; a second hydrodynamic torque transmitting device comprising a pump drive connected to the turbine gear unit output carrier and a rotor drive connected to the forward drive gear unit reaction gear; the second torque transmitting device being arranged to be emptied and filled with fluid so that when filled with fluid and when the power shaft is driving the forward drive gear unit is conditioned for another drive ratio; an overrun brake for holding the second device rotor stationary so that when the load shaft is driving rotation of the forward drive gear unit input gear by the load shaft is resisted; and a lock-up clutch for clutching together the second device pump and the rotor so as to prevent slippage therethrough.

13. In an engine driven transmission; the combination of a power shaft revolvable by the engine; a load shaft; a torque converter having an impeller revolvable with the power shaft, first and second turbines, and a variable position stator; control means for altering the position of the stator; planetary gearing for transferring drive between the turbines and the load shaft; the planetary gearing comprising turbine, forward drive, and reverse drive gear units; the turbine and forward drive gear units each including a reaction gear, an input gear, and an output planet carrier having a plurality of planet pinions revolvably mounted thereon so as to intermesh with the input and reaction gears; the turbine gear unit having the input gear joined to the first turbine and the output carrier arranged to connect the second turbine with the forward drive gear unit input gear; the forward drive gear unit having the output carrier joined to the load shaft; the reverse drive gear unit including an input gear drive connected to the turbine gear unit output carrier; a reaction gear, and an output planet carrier revolvable with the load shaft; the reverse gear unit carrier having revolvably mounted thereon first and second intermeshing planet pinions; the first pinion meshing with the reverse gear unit input gear and the second pinion meshing with the reverse gear unit reaction gear; a turbine gear unit brake for preventing rotation of the turbine gear unit reaction gear in one direction; a forward drive brake for preventing rotation of the forward drive gear unit reaction gear in one direction so as to provide a reduced forward drive ratio through the forward drive gear unit; a reverse drive brake for preventing rotation of the reverse drive gear unit reaction gear so as to cause the load shaft to be revolved backwards; a fluid coupling comprising a pump revolvable with the turbine gear unit output carrier and a rotor revolvable with the forward drive gear unit reaction gear; the fluid coupling being arranged to be emptied and filled with fluid so that when filled with fluid and when the power shaft is driving the forward drive gear unit is conditioned for a substantially direct forward drive ratio; an overrun brake for holding the fluid coupling rotor stationary so that when the load shaft is driving rotation of the forward drive gear unit input gear by the load shaft is resisted; and a lock-up clutch for clutching together the coupling pump and rotor so as to eliminate fluid slippage through the coupling in forward drive.

14. In an engine driven transmission, the combination of a power shaft revolvable by the engine, a load shaft, a first hydrodynamic torque transmitting device having an impeller driven by the power shaft and a plurality of turbines, gearing means for transferring drive between the turbines and the load shaft in different forward drive ratios and a reverse drive ratio, a second hydrodynamic torque transmitting device interposed between the power shaft and the gearing means, the second hydrodynamic torque transmitting device being operative in forward drive when the power shaft is driving to afford a split torque drive whereby part of the torque from the power shaft is transferred by the second device directly to the gearing means and the remaining part of the torque is transferred through the first device and then to the gearing means, means for causing the second hydrodynamic torque transmitting device to be operative in coast drive when the load shaft is driving to function as a brake so as to resist rotation of the load shaft, and means rendering the second device inoperative as a brake when the power shaft assumes the drive from the load shaft.

15. In an engine driven transmission, the combination of a power shaft revolvable by the engine, a load shaft, a hydrodynamic torque transmitting device having an impeller driven by the power shaft and a plurality of turbines, planetary gearing for transferring drive between the turbines and the load shaft at a plurality of forward drive ratios and a reverse drive ratio, the planetary gearing comprising first and secondary planetary gear units each including input, output, and reaction elements, the first gear unit having the input element thereof drive connected to one of the turbines and the output element thereof arranged so as to connect another one of the turbines with the second gear unit input element, the second gear unit having the output element thereof joined to the load shaft, first and second gear unit brakes for preventing rotation of the respective gear unit reaction elements so as to render each gear unit effective to transfer drive, and a second hydrodynamic torque transmitting device interposed between the power shaft and the gearing and so arranged in the forward drive when the power shaft is driving that a split torque drive is afforded whereby part of the torque from the power shaft is transferred thereby directly to the gearing while the remainder of the torque is transferred through the first device and then to the gearing, means for causing the second hydrodynamic torque transmitting device to be operative during coast drive when the load shaft is driving to function as a brake and resist rotation of the load shaft.

16. In an engine driven transmission; the combination of a power shaft revolvable by the engine; a load shaft; a first hydrodynamic torque transmitting device having an impeller revolvable with the power shaft and a plurality of turbines; planetary gearing for transferring drive between the turbines and the load shaft in a plurality of forward drive ratios and a reverse drive ratio; the planetary gearing comprising turbine and forward drive gear units each including a reaction gear, an input gear, and an output planet carrier having a plurality of planet pinions journaled thereon so as to intermesh with the input and reaction gears; the turbine gear unit having the input gear joined to one of the turbines and the output carrier arranged to connect another of the turbines with the forward drive gear unit input gear; the forward drive gear unit having the output gear joined to the load shaft; a turbine gear unit brake for preventing rotation of the turbine gear unit reaction gear in one direction; a forward drive brake for preventing rotation of the forward drive gear unit reaction gear in one direction so as to provide one forward drive ratio therethrough; a second hydrodynamic torque transmitting device comprising a pump drive connected to the power shaft and a rotor drive connected to the forward drive gear unit reaction gear, the second torque transmitting device being arranged to be emptied and filled with fluid so that when filled with fluid and when the power shaft is driving the forward drive gear unit is conditioned for another drive ratio with part of the torque being delivered by the power shaft being transferred directly by the second device to the forward drive gear unit reaction gear and the remaining part of the torque being delivered to the first device; and an overrun brake for holding the second device rotor stationary so that when the load shaft is driving rotation of the forward drive gear unit gear by the load shaft is resisted.

17. In an engine driven transmission; the combination of a power shaft revolvable by the engine; a load shaft; a first hydrodynamic torque transmitting device having an impeller revolvable with the power shaft and a plurality of turbines; planetary gearing for transferring drive between the turbines and the load shaft in a plurality of forward drive ratios and a reverse drive ratio; the planetary gearing comprising turbine, forward drive, and reverse drive gear units each including a reaction gear, an input gear, and an output planet carrier provided with a plurality of planet pinions revolvably arranged thereon so as to intermesh with the input and reaction gears; the turbine gear unit having the input gear joined to one of the plurality of turbines and the output carrier arranged to connect another of the turbines with both the forward drive gear unit input gear and the reverse drive gear unit input gear; the forward and reverse drive gear unit output carrier both being drive connected to the load shaft; a turbine gear unit brake for preventing rotation of the turbine gear unit reaction gear in one direction; a forward drive brake for preventing rotation of the forward drive gear unit reaction gear in one direction so as to provide one forward drive ratio therethrough; a reverse drive brake for preventing rotation of the reverse drive gear unit reaction gear so as to cause the load shaft to be revolved backwards; a second hydrodynamic torque transmitting device comprising a pump drive connected to the power shaft and a rotor drive connected to the forward drive gear unit reaction gear; the second torque transmitting device being arranged to be emptied and filled with fluid so that when filled with fluid and when the power shaft is driving the forward drive gear unit is conditioned for another forward drive ratio with part of the torque delivered by the power shaft being transferred directly by the second device to the forward drive gear unit reaction gear and the remaining part of the torque being delivered to the first device; and an overrun brake for holding the second device rotor stationary so that when the load shaft is driving rotation of the forward drive gear unit input gear by the load shaft is resisted.

18. In an engine driven transmission; the combination of a power shaft revolvable by the engine; a load shaft; a torque converter having an impeller revolvable with the power shaft; first and second turbines, and a variable position stator; control means for altering the position of the stator; planetary gearing for transferring drive between the turbines and the load shaft; the planetary gearing comprising turbine, forward drive, and reverse drive gear units; the turbine and forward drive gear units each including a reaction sun gear, an input ring gear, and an output planet carrier having a plurality of planet pinions revolvably mounted thereon so as to intermesh with the input ring and reaction sun gears; the turbine gear unit having the input ring gear joined to the first turbine and the output carrier arranged to connect the second turbine with the forward drive gear unit input gear; the forward drive gear unit having the output carrier joined to the load shaft; the reverse drive gear unit including an input sun gear drive connected to the turbine gear unit output carrier, a reaction ring gear, and a planet carrier revolvable with the load shaft; the reverse gear unit planet carrier having revolvably mounted thereon first and second intermeshing planet pinions; the first pinion meshing with the reverse unit input sun gear and the second pinion meshing with the reverse unit reaction ring gear; a turbine unit brake for preventing rotation of the turbine gear unit reaction sun gear in one direction so as to render the turbine gear unit effective, a forward drive brake for preventing rotation of the forward drive gear unit reaction sun gear in one direction so as to provide a reduced forward drive ratio therethrough; a reverse drive brake for preventing rotation of the reverse drive gear unit reaction ring gear so as to cause the load shaft to be revolved backwards; a fluid coupling comprising a pump revolvable with the power shaft and a rotor revolvable with the forward drive gear unit reaction sun gear; the fluid coupling being arranged to be emptied and filled with fluid so that when filled with fluid and when the power shaft is driving the forward drive gear unit is conditioned for a substantially direct forward drive ratio with part of the torque delivered by the power shaft being transferred directly by the fluid coupling to the forward drive gear unit reaction sun gear while the remaining part of the torque is delivered to the torque converter impeller; and an overrun brake for holding the fluid coupling rotor stationary so that with the load shaft driving rotation of the power shaft is resisted.

19. In a transmission having plural operating ranges, the combination of power transmitting mechanism for transferring drive between power and load members, ratio changing devices for so conditioning the power transmitting mechanism as to provide different drive ratios therethrough, the ratio changing devices including a hydrodynamic device, means for causing said hydrodynamic device in one operating range when the power member is driving to function as a clutch and in another operating range when the load member is driving to function as a fluid brake, clutch means for locking up the hydrodynamic device in said one range when the power member is driving so as to eliminate fluid slippage through the hydrodynamic device, and mean rendering the clutch means effective only after the hydrodynamic device is operative to function as a clutch.

20. In a transmission, the combination of power and load members, planetary gearing including an input element revolvable by the power member, an output member revolvable with the load member and a reaction element, a hydrodynamic device having first and second rotors, the second rotor being revolvable with the gear unit reaction element and the first rotor being revolvable with one of the other elements, brake means for resisting rotation of the reaction element, the hydrodynamic device functioning as a clutch when the power shaft is driving so as to afford a substantially direct drive ratio through the gear unit and as a fluid brake when the load member is driving and the brake means is operative so as to resist rotation of the load member, means in response to torque demand for rendering the hydrodynamic device inoperative as a brake when the power member reassumes the drive from the load member, and clutch means for locking up the hydrodynamic device when functioning as a clutch so as to eliminate fluid slippage therethrough.

21. In combination, power and load members, forward drive and coast drive trains for transferring drive between the members, selector means for determining the drive train to be effective, a hydrodynamic device common to both of the trains and including a first rotor revolvable with one of the members and a second rotor, a source of fluid pressure, supply valve means for causing the fluid pressure from the source to be delivered to the hydrodynamic device, brake means rendered operative when the coast drive train is effective to oppose rotation of the second rotor so as to cause the hydrodynamic device to function as a brake and resist rotation of said one of the members, connecting means rendered operative when the forward drive train is effective to drive connect the second rotor to the other of the members so as to cause the hydrodynamic device to function as a clutch for transferring drive between the members and when the coast drive train is effective to drive connect the members so that with the brake means operative the hydrodynamic device functions as a fluid brake for resisting rotation of said one of the members, and exhaust valve means for controlling the exhaust of fluid pressure from the hydrodynamic device, the exhaust valve means being operative when the forward drive train is effective to cause fluid pressure to be exhausted from the hydrodynamic device at one rate and when the coast drive train is effective to cause the fluid pressure to be exhausted at another rate.

22. In combination, power and load members, forward drive and coast drive trains for transferring drive between the members, selector means for determining the drive train to be effective, a hydrodynamic device common to both of the trains and including a first rotor revolvable with one of the members and a second rotor, a source of fluid pressure, supply valve means for causing the fluid pressure from the source to be delivered to the hydrodynamic device, brake means rendered operative when the coast drive train is effective to oppose rotation of the second rotor so as to cause the hydrodynamic device to function as a brake and resist rotation of said one of the members, connecting means rendered operative when the forward drive train is effective to drive connect the second rotor to the other of the members so as to cause the hydrodynamic device to function as a clutch for transferring drive between the members and when the coast drive train is effective to drive connect the members so that with the brake means operative the hydrodynamic device functions as a fluid brake for resisting rotation of said one of the members, lock-up clutch means rendered operative when the hydrodynamic device is functioning as a clutch so as to join together the first and second rotors and eliminate fluid slippage therebetween, and exhaust valve means revolvable at speeds proportional to the speed of one of the members so as to be speed responsive for controlling the exhaust of fluid pressure from the hydrodynamic device, the exhaust valve means being operative when the forward drive train is effective to cause fluid pressure to be exhausted from the hydrodynamic device at one rate and when the coast drive train is effective to cause the fluid pressure to be exhausted at a rate that increases in proportion to increases in the speeds of said one member.

23. In combination, power and load members, forward drive and coast drive trains for transferring drive between the members, selector means for determining the drive train to be effective, a hydrodynamic device common to both of the trains and including a first rotor revolvable with one of the members and a second rotor, a source of fluid pressure, supply valve means for causing the fluid pressure from the source to be delivered to the hydrodynamic device, exhaust valve means for controlling the exhaust of fluid pressure from the hydrodynamic device, brake means rendered operative when the coast drive train is effective to oppose rotation of the second rotor so as to cause the hydrodynamic device to function as a brake and resist rotation of said one of the members, connecting means rendered operative when the forward drive train is effective to drive connect the second rotor to the other of the members so as to cause the hydrodynamic device to function as a clutch for transferring drive between the members and when the coast drive train is effective to drive connect the members so that with the brake means operative the hydrodynamic device functions as a fluid brake for resisting rotation of said one of the members, a lock-up clutch interposed between the first and second rotors and engageable when the hydrodynamic device is functioning as a clutch to clutch together the first and second rotors so as to eliminate fluid slippage therebetween, and lock-up clutch control valve means for causing fluid pressure to be supplied for engaging the lock-up clutch when the pressure for the hydrodynamic device has attained a predetermined value.

24. In combination, power and load members, forward drive and coast drive trains for transferring drive between the members, selector means for determining the drive train to be effective, a hydrodynamic device common to both of the trains and including a first rotor revolvable with one of the members and a second rotor, a source of fluid pressure, supply valve means for causing the fluid pressure from the source to be delivered to the hydrodynamic device, exhaust valve means for controlling the exhaust of fluid pressure from the hydrodynamic device, brake means rendered operative when the coast drive train is effective to oppose rotation of the second rotor so as to cause the hydrodynamic device to function as a brake and resist rotation of said one of the members, connecting means rendered operative when the forward drive train is effective to drive connect the second rotor to the other of the members so as to cause the hydrodynamic device to function as a clutch for transferring drive between the members and when the coast drive train is effective to drive connect the members so that with the brake means operative the hydrodynamic device functions as a fluid brake for resisting rotation of said one of the members, a lock-up clutch interposed between the first and second rotors, operative when the hydrodynamic device is functioning as a clutch to join together the first and second rotors so as to eliminate fluid slippage therebetween, and lock-up clutch control valve means responsive to the speed of one of the members, the lock-up clutch control valve means being operative to cause fluid pressure to be supplied for operating the lock-up clutch when the pressure to the hydrodynamic device has attained a predetermined value.

25. In combination, power and load members, forward drive and coast drive trains for transferring drive between the members, a hydrodynamic device common to both trains and including a first rotor revolvable at a speed proportional to the speed of one of the members and a second rotor, selector means for determining the drive train to be effective, a source of fluid pressure for the hydrodynamic device, brake means rendered operative when the coast drive train is effective to oppose rotation of the second rotor so as to cause the hydrodynamic device to function as a brake and resist rotation of said one of the members by the other of the members, connecting means rendered operative when the forward drive train is effective to cause the second rotor to be revolvable at a speed proportional to that of said other of the members so as to cause the hydrodynamic device to function as a clutch for transferring drive between the members and when the coast drive train is effective to drive connect the members so that with the brake means operative the hydrodynamic device functions as a fluid brake for resisting rotation of said one of the members, a lock-up clutch interposed between the first and second rotors and operative when the hydrodynamic device is functioning as a clutch to join together the first and second rotors so as to eliminate fluid slippage therebetween, lock-up clutch control valve means operative to cause fluid pressure to be supplied for operating the lock-up clutch when the pressure to the hydrodynamic device has attained a predetermined value, exhaust valve means operative when the forward drive train is effective to cause fluid pressure to be discharged from the hydrodynamic device at one rate and when the coast drive train is effective to cause the fluid pressure to be discharged at another rate, and relay valve means for establishing communication between the source of fluid pressure and the lock-up clutch control valve means when the forward drive train is effective so as to render the lock-up clutch control valve means operative and for establishing communication between the source of fluid pressure and the exhaust valve means when the coast drive train is effective so as to cause the exhaust valve means to change to said another rate of discharge operation.

26. In combination, power and load members, forward drive and coast drive trains for transferring drive between the members, a hydrodynamic device common to both trains and including a first rotor revolvable at a speed proportional to the speed of one of the members and a second rotor, selector means for determining the drive train to be effective, a source of fluid pressure for the hydrodynamic device, brake means rendered operative when the coast drive train is effective to oppose rotation of the second rotor so as to cause the hydrodynamic device to function as a brake and resist rotation of said one of the members by the other of the members, connecting means rendered operative when the forward drive train is effective to cause the second rotor to be revolvable at a speed proportional to that of said other of the members so as to cause the hydrodynamic device to function as a clutch for transferring drive between the members and when the coast drive train is effective to drive connect the members so that with the brake means operative the hydrodynamic device functions as a fluid brake for resisting rotation of said one of the members, a lock-up clutch interposed between the first and second rotors operative when the hydrodynamic device is functioning as a clutch to join together the first and second rotors so as to eliminate fluid slippage therebetween, lock-up clutch control valve means responsive to the speed of the load member and operative to cause fluid pressure to be supplied for operating the lock-up clutch when the pressure to the hydrodynamic device has attained a predetermined value, exhaust valve means revolvable at speeds proportional to the speeds of the load member and operative when the forward drive train is effective to cause fluid pressure to be discharged from the hydrodynamic device at one rate and when the coast drive train is effective to cause the fluid pressure to be discharged at another rate, and relay valve means responsive to the speed of the load member and arranged to establish communication between the source of fluid pressure and the lock-up clutch control valve means when the forward drive train is effective so as to render the lock-up clutch control valve means operative and to establish communication between the source of fluid pressure and the exhaust valve means when the coast drive train is effective so as to cause the exhaust valve means to change to said another rate of discharge operation.

27. In combination, power and load members, forward drive and coast drive trains interposed between the members, selector means for determining the drive train to be effective, a hydrodynamic device common to both trains and including a first rotor revolvable at a speed proportional to the speed of one of the members and a second rotor, a source of fluid pressure, a supply valve responsive to both the speed and the torque demand on the load member for causing fluid pressure from the source to be delivered to the hydrodynamic device when a predetermined relationship between the speed of the load member and the torque demand thereon is attained, a limit valve responsive to the speed of the load member and arranged between the supply valve and the hydrodynamic device so as to prevent fluid pressure between the limit valve and the supply valve from falling below a predetermined minimum, brake means rendered operative when the coast drive train is effective to oppose rotation of the second rotor so as to cause the hydrodynamic device to function as a brake and resist rotation of said one of the members by the other of the members, connecting means rendered operative when the forward drive train is effective to drive connect the second rotor to said other of the members so as to cause the hydrodynamic device to function as a clutch for transferring drive between the members and when the coast drive train is effective to drive connect the members so that with the brake means operative the hydrodynamic device functions as a fluid brake for resisting rotation of said one of the members, a lock-up clutch interposed between the first and second rotors operative when the hydrodynamic device is functioning as a clutch to join together the first and second rotors so as to eliminate fluid slippage therebetween, an exhaust valve responsive to the speed of the load member and effective to control the rate of discharge of fluid pressure from the hydrodynamic device in accordance therewith, a lock-up clutch valve responsive to both the speed of the load member and the torque demand thereon so as to be effective in accordance therewith to cause fluid pressure to be supplied to the lock-up clutch after the pressure in the hydrodynamic device has attained a predetermined value, and a relay valve responsive to the speed of the load member and the torque demand thereon, the relay valve being effective when the forward drive train is effective to cause the lock-up clutch valve to be placed in communication with the supply valve and when the coast drive train is effective to establish communication between the exhaust valve and the supply valve so as to cause the exhaust valve to discharge fluid pressure from the hydrodynamic device at a different rate.

28. In a transmission provided with plural operating ranges including a forward drive range and a coast drive range, the combination of power and load members, power transmitting mechanism between the members, the power transmitting mechanism comprising a planetary gear unit having an input element revolvable at a speed proportional to the speed of the power member, an output element revolvable at a speed proportional to the speed of the load member, and a reaction element, ratio changing devices for conditioning the power transmitting mechanism for drive in different ratios, the ratio changing devices including a forward drive brake for preventing rotation of the gear unit reaction element in one direction so as to condition the gear unit for drive in one ratio, a hydrodynamic device arranged to be emptied and filled with fluid and having a plurality of rotors, one of the rotors being drive connected to one of the gear unit elements and another of the rotors to another of the gear unit elements so that when the hydrodynamic device is filled with fluid the gear unit is prepared for drive at a substantially direct drive ratio, coast brake means operative in the coast drive range to prevent rotation of one of the rotors in either direction, a source of fluid pressure, a shift valve arranged upon attainment in the forward drive range of a predetermined speed of the load member to cause fluid pressure to be supplied by the source to the hydrodynamic device, the shift valve in the coast drive range being operative at a predetermined minimum speed to establish communication between the source and the hydrodynamic device so that the hydrodynamic device functions as a brake to resist rotation of the power member by the load member, a lock-up clutch for joining together said one and said another of the rotors so as to prevent fluid slippage through the hydrodynamic device, a lock-up clutch valve operative to cause the lock-up clutch to become operative when the pressure being supplied to the hydrodynamic device attains a predetermined value, an exhaust valve for controlling the discharge of fluid pressure from the hydrodynamic device, the exhaust valve being arranged to provide a relatively constant and a variable rate of discharge from the hydrodynamic device, and a relay valve effective in the forward drive range to establish communication between the shift valve and the lock-up clutch valve and in the coast drive range being operative to establish communication between the shift valve and the exhaust valve so that the variable rate of discharge is established by the exhaust valve.

29. In a transmission having plural operating ranges, the combination of power transmitting mechanism interposed between power and load shafts, fluid pressure operated ratio changing devices for so conditioning the power transmitting mechanism as to provide different drive ratios therethrough, a source of fluid pressure, revolvable valving means rotatable at a speed proportional to the speed of one of the shafts for controlling the operation of one of the devices in accordance therewith, and stationary valving means for determining the operating range and for causing operating pressure to be supplied by the source both to the other of the ratio changing devices in a sequence determined by the operating range selected and to the revolvable valving means, the revolvable valving means being operative upon attainment of a predetermined operating condition to cause the operating pressure from the stationary valving means to be supplied to said one device so as to produce a ratio change.

30. In a transmission having plural operating ranges, the combination of power transmitting mechanism interposed between power and load shafts, fluid pressure operated ratio changing devices for so conditioning the power transmitting mechanism as to provide different drive ratios therethrough, a source of fluid pressure, revolvable valving means rotatable at a speed proportional to the speed of one of the shafts for controlling the operation of one of the devices, stationary valving means for determining the operating range and for causing operating pressure to be supplied by the source both to the other of the ratio changing devices in a sequence determined by the operating range selected and to the revolvable valving means, the revolvable valving means being operative upon attainment of a predetermined relationship between the speed of the revolvable valving means and the torque demand on the load shaft to cause the operating pressure from the stationary valving means to be supplied to said one device so as to produce a ratio change, and means controlled by the revolvable valving means and communicating with the stationary valving means so as to indicate to the stationary valving means the ratio status of said one device.

31. In a transmission provided with plural operating ranges, the combination of power transmitting mechanism interposed between power and load shafts, fluid pressure operated ratio changing devices for so conditioning the power mechanism as to provide different drive ratios therethrough, means providing plural operating fluid pressures, revolvable valving means rotatable at a speed proportional to the speed of the load shaft for controlling the operation of one of the devices, stationary valving means including a selector valve for causing one of the operating fluid pressures to be delivered to the other devices and to the revolvable valving means in accordance with the requirements of the selected operating range, the revolvable valving means including a shift valve in communication with another of the operating fluid pressures so as to be operative to transfer said one of the operating fluid pressures from the stationary valving means to said one device and thereby produce a ratio change when a predetermined relationship between said another operating pressure and the speed of the revolvable valving means exists.

32. In a transmission provided with plural operating ranges including a forward drive range and a coast drive range, the combination of power transmitting mechanism interposed between the power and load shafts, fluid operated ratio changing devices for so conditioning the power transmitting mechanism as to provide different drive ratios therethrough, means for causing one of the devices to perform as a clutch in the forward drive range so as to provide one drive ratio and as a brake in the coast drive range so as to resist rotation of the load shaft, means providing operating fluid pressure and torque demand responsive pressure, the torque demand responsive pressure being reflective of the torque load on the load shaft, revolvable valving means rotatable at a speed proportional to the speed of the load shaft for controlling the operation of said one device, stationary valving means including a selector valve for causing the operating fluid pressure to be delivered to the other devices and to the revolvable valving means in accordance with the requirements of the selected operating range, the revolvable valving means including a shift valve in communication with the torque demand responsive pressure when in the forward drive range so as to be operative to transfer operating fluid pressure to said one device and thereby produce a ratio change to said one drive ratio when a predetermined relationship exists between the torque demand responsive pressure and the speed of the revolvable valving means and out of communication with the torque demand responsive pressure when in the coast drive range so that at a predetermined minimum speed of the revolvable valving means operating fluid pressure is supplied to said one device and the said device functions as a brake.

33. In a transmission having plural operating ranges including a forward drive range and a coast drive range; the combination of power transmitting mechanism interposed between power and load shafts; fluid pressure operated ratio changing devices for so conditioning the power transmitting mechanism as to provide different drive ratios therethrough; means for causing one of the ratio changing devices to perform as a clutch in the forward drive range so as to provide one drive ratio and as a brake in the coast drive range so as to resist rotation of the load shaft; a source of operating fluid pressure; revolvable valving means including a valve body rotatable at a speed proportional to the speed of the load shaft and a series of valves mounted in the rotatable valve body so as to be responsive to the speed thereof; stationary valving means including a selector valve for causing the operating fluid pressure to be distributed both to the different ratio changing devices and the revolvable valving means in accordance with the requirements of the selected operating range, and a torque demand valve for developing a torque demand responsive pressure reflective of the torque demand on the load shaft; the series of valves mounted in the rotatable valve body including a shift valve in communication with the source of operating fluid pressure when the forward drive range is effective so as to be operative in an upshifted position thereof to cause operating fluid pressure to be transferred to said one device and thereby cause said one device to function as a clutch when a predetermined load and speed relationship between the torque demand on the load shaft and the speed of the load shaft exists and out of communication with the torque demand responsive pressure when the coast drive range is effective so as to cause the operating fluid pressure to be supplied to said one device at a predetermined minimum speed of the revolvable valving means and thereby cause said one device to be filled with fluid pressure and function as a brake, an exhaust valve arranged to control flow from said one device in accordance with the speed of the rotatable valve body, and a governor valve for producing a governor pressure that varies with the speed of the rotatable valve body, the governor pressure being employed to operate another one of the devices, the shift valve in the upshifted position acting to cause the governor valve to become inoperative.

34. In a transmission having plural operating ranges including a forward drive range and a coast drive range; the combination of power transmitting mechanism interposed between power and load shafts; fluid pressure operated ratio changing devices for so conditioning the power transmitting mechanism as to provide different drive ratios therethrough; one ratio changing device performing as a clutch in the forward drive range so as to provide one drive ratio and as a brake in the coast drive range so as to resist rotation of the load shaft; brake means operative in the coast drive range to cause said one device to function as a brake; a source of operating fluid pressure; revolvable valving means including a valve body rotatable at a speed proportional to the speed of the load shaft and a series of valves mounted therein so as to be responsive to the speed of rotation thereof; stationary valving means including a selector valve for causing the operating fluid pressure to be distributed both to the different ratio changing devices and the revolvable valving means in accordance with the requirements of the selected operating range, a torque demand valve for developing a torque demand responsive pressure reflective of the torque demand on the load shaft, and a brake valve operative in the coast drive range to transfer operating fluid pressure to the brake means and render the brake means effective; means for preventing the brake valve from being operative to transfer operating fluid pressure to the brake means when the torque demand on the load shaft exceeds a predetermined value; the series of valves mounted in the rotatable valve body including a shift valve in communication with the source of operating fluid pressure when the forward drive range is effective so as to be operative in an upshifted position to cause operating fluid pressure to be transferred to said one device and thereby cause said on device to function as a clutch when a predetermined relationship between the torque demand responsive pressure and the speed of the rotatable valve body exists and out of communication with the torque demand responsive pressure when the coast drive range is effective so as to cause the operating fluid pressure to be supplied to said one device at a predetermined minimum speed of the rotatable valve body and thereby cause said one device to be filled with fluid pressure and function as a brake, an exhaust valve arranged to control flow from said one device in accordance with the speed of the rotatable valve body, and a governor valve for producing a governor pressure that varies with the speed of the rotatable valve body, the governor pressure communicating with the brake valve so as to cause the brake valve to be operative in the forward drive range to supply operating fluid pressure for rendering the brake means effective; the shift valve in the upshifted position acting to cause the governor valve to become inoperative.

35. In a transmission provided with plural operating ranges including a forward drive range and a coast drive range; the combination of power transmitting mechanism drivingly interposed between power and load shafts; fluid operated ratio changing devices for so conditioning the power mechanism so as to drive different drive ratios therethrough; the ratio changing devices including a hydrodynamic device; means for causing the hydrodynamic device when filled with fluid to be operative in the forward drive range to function as a clutch and produce a ratio change and in the coast drive range to function as a brake and resist rotation of one of the shafts; means providing plural operating fluid pressures; revolvable valving means rotatable at a speed proportional to the speed of the load shaft so as to be responsive to the speed thereof and control the operation of the hydrodynamic device; stationary valving means including a selector valve for causing one of the operating fluid pressures to be delivered to the others of the devices and the revolvable valving means in accordance with the requirements of the selected operating range; the revolvable valving means including a shift valve in communication with the other of the operating pressures so as to be operative to transfer said one operating fluid pressure to the hydrodynamic device and thereby cause the hydrodynamic device to function as a clutch and produce a ratio change when a predetermined relationship between the torque demand on the load shaft and the speed of the load shaft exists and out of communication with said other operating pressure when in the coast drive range so as to cause said one operating pressure to be supplied to the hydrodynamic device at a predetermined minimum speed of the revolvable valving means and thereby cause the hydrodynamic device to function as a brake.

36. In a transmission having plural operating ranges including a forward drive range and a coast drive range; the combination of power transmitting mechanism interposed between power and load shafts; fluid pressure operated ratio changing devices for so conditioning the power transmitting mechanism as to provide different drive ratios therethrough; the ratio changing devices including a hydrodynamic device having a first rotor revolvable at a speed proportional to the speed of one of the shafts and a second rotor, brake means operative in the coast drive range to oppose rotation of the second rotor so as to cause the hydrodynamic device to function as a fluid brake when filled with fluid and resist rotation of the load shaft, means for drive connecting the second rotor to the other of the shafts in the forward drive range so as to cause the hydrodynamic device to function as a fluid clutch in the forward drive range when filled with fluid thereby producing a different drive ratio through the power transmitting mechanism, and lock-up clutch means operative to clutch together the first and second rotors so as to prevent fluid slippage between the rotors when the hydrodynamic device is functioning as a clutch; means providing plural operating fluid pressures; revolvable valving means rotatable at a speed proportional to the speed of the load shaft for controlling the hydrodynamic device in accordance therewith; stationary valving means including a selector valve for causing the operating fluid pressure to be distributed to the different ratio changing devices and the revolvable valving means in accordance with the requirements of the selected operating range; the revolvable valving means including a shift valve in communication with another of the operating fluid pressures when the forward drive range is effective so as to be operative to cause said one operating fluid pressure to be transferred to the hydrodynamic device and thereby cause the hydrodynamic device to function as a clutch when a predetermined load and speed relationship between the torque demand on the load shaft and the speed of the load shaft exists and out of communication with said another operating fluid pressure when the coast drive range is effective so as to cause said one operating fluid pressure to be supplied to the hydrodynamic device at a predetermined minimum speed of the revolvable valving means and thereby cause the hydrodynamic device to be filled and function as a brake, a lock-up clutch valve operative to cause the lock-up clutch means to be effective when the pressure to the hydrodynamic device attains a predetermined value and when the hydrodynamic device is performing as a clutch, an exhaust valve arranged to control flow from the hydrodynamic device so that different rates of fluid discharge are afforded, one rate of fluid discharge increasing as the speed of the revolvable valving means increases, and a relay valve effective in the forward drive range to establish communication between the shift valve and the lock-up clutch valve so that the lock-up clutch means may become operative and in the coast drive range to establish communication between the shift valve and the exhaust valve so that said one rate of fluid discharge is established by the exhaust valve.

37. In a transmission for a throttle controlled engine; the transmission having plurality operating ranges including a forward drive range and a coast drive range, the combination of power transmitting mechanism interposed between power and load shafts; fluid pressure operated ratio changing devices for so conditioning the power transmitting mechanism as to provide different drive ratios therethrough; the ratio changing devices including a hydrodynamic device having a first rotor revolvable at a speed proportional to the speed of one of the shafts and a second rotor, brake means operative in the coast drive range to oppose rotation of the second rotor so as to cause the hydrodynamic device to function as a fluid brake when filled with fluid and resist rotation of the load shaft, means for drive connecting the second rotor to the other of the shafts in the forward drive range so as to cause the hydrodynamic device to function as a fluid clutch in the forward drive range when filled with fluid thereby producing a different drive ratio through the power transmitting mechanism, and lock-up clutch means operative to clutch together the first and second rotors so as to prevent fluid slippage between the rotors when the hydrodynamic device is functioning as a clutch; means providing operating fluid pressure and throttle pressure reflecting torque demand on the load shaft; the throttle pressure increasing and decreasing as the throttle opening increases and decreases; revolvable valving means rotatable at a speed proportional to the speed of the load shaft for controlling the hydrodynamic device in accordance therewith; stationary valving means including a selector valve for causing the operating fluid pressure to be distributed to the different ratio changing devices and the revolvable valving means in accordance with the requirements of the selected operating range; the revolvable valving means including a shift valve in communication with another of the operating fluid pressures when the forward drive range is effective so as to be operative to cause said one operating fluid pressure to be transferred to the hydrodynamic device and thereby cause the hydrodynamic device to function as a clutch when a predetermined relationship between the torque demand on the load shaft and the speed of the load shaft exists and out of communication with said another operating fluid pressure when the coast drive range is effective so as to cause said one operating fluid pressure to be supplied to the hydrodynamic device at a predetermined minimum speed of the revolvable valving means and thereby cause the hydrodynamic device to be filled and function as a brake, a lock-up clutch valve operative to cause the lock-up clutch means to be effective when the pressure to the hydrodynamic device attains a predetermined value and when the hydrodynamic device is performing as a clutch, an exhaust valve arranged to control flow from the hydrodynamic device so that different rates of fluid discharge are afforded, one rate of fluid discharge increasing as the speed of the revolvable valving means increases, and a relay valve effective in the forward drive range to establish communication between the shift valve and the lock-up clutch valve so that the lock-up clutch means may become operative and in the coast drive range to establish communication between the shift valve and the exhaust valve so that said one rate of fluid discharge is established by the exhaust valve.

38. In a transmission having plural operating ranges including a forward drive range and a coast drive range; the combination of power transmitting mechanism interposed between power and load shafts; fluid pressure operated ratio changing devices for so conditioning the power transmitting mechanism as to provide different drive ratios therethrough; the ratio changing devices including a hydrodynamic device having a first rotor revolvable at a speed proportional to the speed of one of the shafts and a second rotor, brake means operative in the coast drive range to oppose rotation of the second rotor so as to cause the hydrodynamic device to function as a fluid brake when filled with fluid and resist rotation of the load shaft, means for drive connecting the second rotor to the other of the shafts in the forward drive range so as to cause the hydrodynamic device when filled with fluid to function as a fluid clutch in the forward drive range thereby producing a different drive ratio through the power transmitting mechanism, and lock-up clutch means operative to clutch together the first and second rotors so as to prevent fluid slippage between the rotors when the hydrodynamic device is functioning as a clutch; a source of operating fluid pressure; revolvable valving means including a valve body rotatable at a speed proportional to the speed of the load shaft and a series of valves mounted in the rotatable valve body so as to be responsive to the speed thereof; stationary valving means including a selector valve for causing the operating fluid pressure to be distributed both to the different ratio changing devices and the revolvable valving means in accordance with the requirements of the selected operating range, a torque demand valve for developing a torque demand responsive pressure reflective of the torque demand on the load shaft, and a brake valve operative in the coast drive range to transfer operating fluid pressure to the brake means and render the brake means effective; means for preventing the brake valve from being operative to transfer operating fluid pressure to the brake means when the torque demand on the load shaft exceeds a predetermined value; the series of valves mounted in the rotatable valve body including a shift valve in communication with the source of operating fluid pressure when the forward drive range is effective so as to be operative in an upshifted position thereof to cause operating fluid pressure to be transferred to the hydrodynamic device and thereby cause the hydrodynamic device to function as a clutch when a predetermined load and speed relationship between the torque load on the load shaft and the speed of the load shaft exists and out of communication with the torque demand responsive pressure when the coast drive range is effective so as to cause the operating fluid pressure to be supplied to the hydrodynamic device at a predetermined minimum speed of the revolvable valving means and thereby cause the hydrodynamic device to be filled with fluid pressure and function as a brake, a lock-up clutch valve operative to cause the lock-up clutch means to be effective when the pressure to the hydrodynamic device attains a predetermined value with the hydrodynamic device performing as a clutch, an exhaust valve arranged to control flow from the hydrodynamic device so that a relatively constant and a variable rate of discharge therefrom are afforded with the variable rate increasing as the speed of the rotatable valve body increases, a relay valve effective in the forward drive range to establish communication between the shift valve and the lock-up clutch valve so that the lock-up clutch means may become operative and in the coast drive range to establish communication between the shift valve and the exhaust valve so that the variable rate of fluid discharge is established by the exhaust valve, and a governor valve for producing a governor pressure that varies with the speed of the rotatable valve body; the governor pressure communicating with the brake valve so as to urge the brake valve to the operative position in the forward drive range and cause operating fluid pressure to be supplied for rendering the brake means effective; the shift valve in the upshifted position acting to cause the governor valve to become inoperative.

39. A governor for a fluid controlled mechanism comprising, in combination, a body revolvable by the mechanism, a governor valve mounted in the body for rotation therewith, the governor valve being provided with an inlet and an outlet, a source of fluid pressure, primary means operative to connect the source and the inlet so that the governor valve is effecitve to deliver to the outlet a regulated output pressure varying with the speed of rotation of the body, and secondary means operative to connect the source and the outlet when the output pressure tends to fall below a predetermined minimum so as to cause the governor valve to regulate at the predetermined minimum pressure.

40. A governor for a fluid controlled mechanism comprising, in combination, a body revolvable by the mechanism, a governor valve mounted in the body for rotation therewith, the governor valve being provided with an inlet and an outlet, a source of fluid pressure, primary means operative to connect the source and the inlet so that the governor valve is effective to deliver to the outlet a regulated output pressure tha varies with the speed of rotation of the body, and secondary means operative when the source is disconnected from the inlet by the primary means and when the regulated output pressure tends to fall below a predetermined minimum to connect the source to the outlet so as to cause the governor valve to regulate at the predetermined minimum pressure.

41. A governor for a fluid controlled mechanism comprising in combination, a body revolvable by the mechanism, a governor valve mounted in the body for rotation therewith, the governor valve being provided with an inlet and an outlet, a source of fluid pressure, primary means operative to connect the source and the inlet so that the governor valve is effective to deliver to the outlet a regulated output pressure that increases in proportion to increases in the speed of rotation of the body, and secondary means including a check valve interposed between the source and the outlet, the check valve being arranged to establish communication between the source and the outlet when the output pressure from the governor valve tends to fall below a predetermined minimum.

42. In a transmission control system, the combination of a body revolvable with the transmission, a governor valve mounted in the body for rotation therewith, the governor valve being provided with an inlet and an outlet, a source of fluid pressure, primary means including a shift valve having plural positions for controlling the operating ratios of the transmission, the shift valve in one of the plural positions connecting the source to the inlet of the governor valve so that the governor valve is effective to deliver to the outlet a regulated output pressure varying with the speed of rotation of the body, and secondary means including a check valve interposed between the source and the outlet of the governor valve, the check valve being arranged to establish communication between the source and the outlet when the output pressure from the governor valve tends to fall below a predetermined minimum.

43. In a transmission control system, the combination of a selector valve provided with a series of settings corresponding to the operating ranges of the transmission, a body revolvable by the transmission, a governor valve mounted in the body for rotation therewith, the governor valve being provided with an inlet and an outlet, a source of fluid pressure connected to the selector valve, primary means including a shift valve having plural positions for controlling the operating ratios of the transmission, the shift valve in one of the plural positions connecting the selector valve and the inlet to the governor valve so that when the selector valve is in one of the series of settings fluid pressure is supplied by the source to the governor valve so as to render the governor valve effective to deliver to the outlet a regulated output pressure that increases in proportion to increases in the speed of rotation of the body, and secondary means including a check valve interposed between the selector valve and the inlet, the selector valve being arranged to establish communication between the source and the outlet to the governor valve when the selector valve is in another one of the series of settings and when the output pressure from the governor valve tends to fall below a predetermined minimum.

44. In a transmission control system, the combination of a selector valve for establishing different ranges of transmission operation including a forward drive range and a neutral, a body revolvable by the transmission, a governor valve mounted in the body for rotation therewith, the governor valve being provided with an inlet and an outlet, a source of fluid pressure connected to the selector valve, a shift valve movable to and from an upshifted position for controlling the operating ratios of the transmission, the shift valve when moved from the upshifted position being arranged to connect the selector valve and the inlet to the governor valve so that when the selector valve is in the forward drive range setting fluid pressure is supplied by the source to the governor valve so as to render the governor valve effective to deliver to the outlet a regulated output pressure that increases in proportion to increases in the speed of rotation of the body, a passage between the selector valve and the outlet of the governor valve, the passage having a restriction therein and a check valve positioned between the restriction and the governor valve outlet, the selector valve in the neutral setting interrupting the communication between the source and the shift valve and establishing communication between the restricted passage and the source, the check valve being arranged when the selector valve is in the neutral setting to establish communication between the source and the outlet of the governor valve when the output pressure from the governor valve tends to fall below a predetermined minimum.

45. In a transmission having plural ranges of overrun braking, the combination of a fluid pressure operated brake for increasing the overrun braking afforded by the transmission, means providing plural fluid pressures including a variable pressure and an operating pressure, and brake valve means arranged to connect the brake to the operating pressure in one range and to the variable pressure in another range.

46. In a transmission having plural ranges of overrun braking, the combination of a fluid pressure operated brake for increasing the overrun braking afforded by the transmission, means providing plural fluid pressures including a pressure responsive to the speed of the transmission and an operating pressure, and a brake valve arranged to deliver for operating the brake the speed responsive pressure when of a predetermined value in one range and operating pressure in another range.

47. In a transmission having plural ranges of overrun braking, the combination of a fluid pressure operated brake for increasing the overrun braking afforded by the transmission, a governor revolvable by the transmission and effective in one range to produce a speed responsive pressure that varies with the speed of the governor, means providing plural pressures including a pressure responsive to the torque demand on the transmission and a source of operating pressure, and a brake valve arranged to place the brake in communication with the governor when the governor develops a predetermined pressure in said one overrun braking range and with the operating pressure source when the torque demand responsive pressure is below a predetermined maximum in another overrun braking range.

48. In a control system for a plural forward drive operating range transmission, the combination of a primary valve arranged to develop torque demand responsive pressure that increases in proportion to increases in the torque demand on the transmission, a secondary valve in communication with the primary valve, the secondary valve being arranged in one range of transmission operation to be inoperative, in another range of transmission operation to produce a modulated pressure that varies with changes in the torque demand responsive pressure within predetermined limits, and in still another range of transmission operation to provide a maximum pressure.

49. In a control system for a plural forward drive operating range transmission adapted for use with a throttle controlled engine, the combination of a primary throttle valve arranged to develop throttle pressures that increase in proportion to increases in throttle openings, and a secondary throttle valve in communication with the primary throttle valve, the secondary throttle valve being arranged in one transmission operating range to be inoperative, in another transmission operating range to produce a modulated pressure that varies with changes in throttle pressure, and in still another transmission operating range to provide a maximum pressure.

50. In a control system for a plural forward drive operating range transmission adapted for use with a throttle controlled engine, the combination of a primary throttle valve arranged to develop throttle pressures that increase in proportions to increases in throttle openings, and a secondary throttle valve in communication with the throttle primary valve, the secondary throttle valve being arranged in one range of transmission operation to be inoperative, in another range of transmission operation to produce a modulated pressure that varies with changes in throttle pressure, and in still another range of transmission operation to provide a maximum pressure, the modulated pressure in said another range having a minimum that is a predetermined amount greater than minimum throttle pressure and a maximum that is equal to the maximum throttle pressure.

51. In a transmission, the combination of forward and coast drive trains, a hydrodynamic device, means for causing said hydrodynamic device to function as a clutch when the forward drive train is effective and as a brake when the coast drive train is effective, a source of pressure fluid for the device, and exhaust means operative to afford one rate of fluid discharge from the device when the device is functioning as a clutch and another rate of fluid discharge from the device when the device is functioning as a brake.

52. In a transmission, the combination of forward and coast drive trains, a hydrodynamic device, means for causing said hydrodynamic device to function as a clutch when the forward drive train is effective and as a brake when the coast drive train is effective, a source of pressure fluid for the device, and exhaust valve means responsive to the speed of the device, the exhaust valve means being operative to afford a relatively constant rate of fluid discharge from the device when the device is performing as a clutch and a variable rate of fluid discharge when the device is performing as a brake, the variable rate increasing as the speed of the device increases.

53. In a transmission, the combination of forward and coast drive trains, a hydrodynamic device comprising a pair of rotors, the rotors being so arranged with respect to the forward drive train that the device functions as a clutch when the forward drive train is effective, means for resisting rotation of one of the rotors when the coast drive train is effective so that the device functions as a brake, the device having an inlet communicating with a source of pressure fluid and a pair of outlets, one of the outlets being at the periphery of the device, and an exhaust valve arranged so as to be revolvable at a speed proportional to the speeds of one of the rotors, the exhaust valve being operative to exhaust the other of the outlets at a relatively constant rate of fluid discharge when the device is functioning as a clutch and to exhaust said one of the outlets at a variable rate of fluid discharge when the device is functioning as a brake, the variable rate increasing with the speed of said one rotor.

54. A hydrodynamic brake comprising relatively rotatable rotors, means supplying fluid to the brake, a fluid exhaust for the brake, and means revolvable at a speed corresponding to the speed of one of the rotors and arranged so as to alter the rate of discharge of fluid from the fluid exhaust with changes in speed of said one rotor.

55. A hydrodynamic brake comprising relatively rotatable rotors, means resisting rotation of one of the rotors, means supplying fluid to the brake, and exhaust means responsive to the speed of the other of the rotors and effective to control the rate of discharge of fluid from the brake in accordance therewith.

56. A hydrodynamic brake comprising a pair of relatively rotatable rotors, means resisting rotation of one of the rotors, an inlet to and an outlet from the brake, means supplying fluid to the inlet, and exhaust valve means revolvable at speeds corresponding to the speeds of the other of the rotors, the exhaust valve means being effective to increase the rate of discharge of fluid from the brake outlet in proportion to increases in speed of said other of the rotors.

57. In an engine driven transmission; the combination of a power shaft revolvable by the engine; a load shaft, a first hydrodynamic torque transmitting device having an impeller driven by the power shaft and a turbine; gearing means for transferring drive between the turbine and the load shaft; the gearing means including a forward drive planetary gear unit having a sun gear, a ring gear drive connected to the turbine, and a planet carrier drive connected to the load shaft and having a planet pinion revolvable thereon so as to intermesh both of the ring and sun gears and a reverse drive planetary gear unit having a sun gear connected to the forward drive gear unit ring gear, a ring gear, double intermeshing planet pinions, one pinion meshing with the ring gear and the other meshing with the sun gear, and a planet carrier revolvably supporting the double intermeshing pinions, a second hydrodynamic torque transmitting device interconnecting the forward drive gear unit sun and ring gears so that when operative a direct forward drive ratio is established through the forward drive gear unit; forward drive brake means holding the forward drive gear unit sun gear so as to provide another forward drive ratio through the forward drive gear unit; and reverse drive brake means holding the reverse drive gear unit ring gear so as to provide a reverse drive ratio through the transmission; the second hydrodynamic device also being operative to perform as a brake when the forward drive brake means is operative so as to resist rotation of the load shaft in coast drive.

58. In an engine driven transmission; the combination of a power shaft revolvable by the engine; a load shaft; a first hydrodynamic torque transmitting device having an impeller driven by the power shaft and a turbine; gearing means for transferring drive between the turbine and the load shaft in different forward drive ratios and a reverse drive ratio; the gearing means including a forward drive planetary gear unit having a sun gear, a ring gear drive connected to the turbine, a planet carrier connected to the load, and a planet pinion journaled on the carrier so as to intermesh with the ring and sun gears; a reverse drive planetary gear unit having a sun gear joined to the forward drive gear unit ring gear, a ring gear, a planet carrier drive connected to the load shaft, and double intermeshing planet pinions revolvably supported on the carrier so that one pinion meshes with the ring gear and the other pinion meshes with the sun gear; forward drive brake means resisting rotation on the forward drive gear unit sun gear so as to provide one forward drive ratio therethrough; a second hydrodynamic torque transmitting device interconnecting the first gear unit sun gear and the power shaft so as to provide a split torque drive through the transmission and a different forward drive ratio; and reverse drive brake means resisting rotation of the reverse drive gear unit ring gear so as to provide a reverse drive ratio though the transmission; the second hydrodynamic device being operative when the forward drive brake means is effective to resist rotation of the load shaft in coast drive.

59. In an engine driven transmission; the combination of a power shaft revolvable by the engine; a load shaft; a first hydrodynamic torque transmitting device having an impeller driven by the power shaft and a turbine; gearing means for transferring drive between the turbine and the load shaft in different forward drive ratios and a reverse drive ratio, the gearing means including a forward drive planetary gear unit having a sun gear, a ring gear drive connected to the turbine and a planet carrier drive connected to the load shaft, the planet carrier having a planet pinion journaled thereon so as to intermesh with the ring and sun gears; a reverse drive planetary gear unit having a sun gear drive connected to the forward drive gear unit ring gear, a ring gear drive connected to the forward drive gear unit planet carrier, and a planet carrier having a planet pinion so arranged thereon so as to intermesh with the ring and sun gears; forward drive brake means resisting rotation of the forward drive gear unit sun gear so as to provide one forward drive ratio through the transmission; a second hydrodynamic torque transmitting device drivingly interposed between the forward drive gear unit sun gear and the forward drive gear unit planet carrier so as to provide a substantially direct forward drive ratio through the transmission; and reverse drive brake means resisting rotation of the reverse drive gear unit planet carrier so as to provide a reverse drive ratio through the transmission; the second hydrodynamic torque transmitting device also being operative in coast drive with the forward drive brake means effective to resist rotation of the load shaft in coast drive.

References Cited in the file of this patent

UNITED STATES PATENTS

| | | |
|---|---|---|
| 2,782,657 | Lucia | Feb. 26, 1957 |
| 2,851,906 | De Lorean | Sept. 16, 1958 |
| 2,855,803 | Knowles | Oct. 14, 1958 |
| 2,861,474 | Moore | Nov. 25, 1958 |
| 2,873,618 | De Lorean | Feb. 17, 1959 |
| 2,876,656 | Herndon | Mar. 10, 1959 |
| 2,903,910 | Carnegie | Sept. 15, 1959 |
| 2,943,516 | Herndon | July 5, 1960 |
| 2,964,975 | De Lorean | Dec. 20, 1960 |
| 2,987,941 | Qualman et al. | June 13, 1961 |
| 3,004,446 | Flinn | Oct. 17, 1961 |